United States Patent
Jana et al.

(10) Patent No.: US 11,476,959 B2
(45) Date of Patent: *Oct. 18, 2022

(54) SYSTEM AND METHOD FOR THROUGHPUT PREDICTION FOR CELLULAR NETWORKS

(71) Applicants: AT&T Intellectual Property I, L.P., Atlanta, GA (US); University College Cork-National University of Ireland, Cork (IE)

(72) Inventors: Rittwik Jana, Montville, NJ (US); Emir Halepovic, Somerset, NJ (US); Rakesh Sinha, Edison, NJ (US); Vijay Gopalakrishnan, Edison, NJ (US); Ahmed Zahran, Cork (IE); Darijo Raca, Cork (IE); Cormac John Sreenan, Ballinora (IE); Balagangadhar G. Bathula, Lawrenceville, NJ (US); Matteo Varvello, Holmdel, NJ (US)

(73) Assignees: AT&T Intellectual Property I, L.P., Atlanta, GA (US); University College Cork—National University of Ireland, Cork (IE)

( * ) Notice: Subject to any disclaimer, the term of this patent is extended or adjusted under 35 U.S.C. 154(b) by 92 days.

This patent is subject to a terminal disclaimer.

(21) Appl. No.: 16/855,479

(22) Filed: Apr. 22, 2020

(65) Prior Publication Data
US 2020/0252147 A1 Aug. 6, 2020

Related U.S. Application Data

(63) Continuation of application No. 16/118,796, filed on Aug. 31, 2018, now Pat. No. 10,693,575.

(51) Int. Cl.
*G06F 11/00* (2006.01)
*H04B 17/373* (2015.01)
(Continued)

(52) U.S. Cl.
CPC .......... *H04B 17/373* (2015.01); *G06N 20/00* (2019.01); *H04B 17/382* (2015.01);
(Continued)

(58) Field of Classification Search
CPC .............. H04B 17/373; H04B 17/3913; H04B 17/382; H04B 17/327; G06N 20/00;
(Continued)

(56) References Cited

U.S. PATENT DOCUMENTS 5,884,037 A 3/1999 Aras et al.
6,269,078 B1 7/2001 Lakshman et al.
(Continued)

FOREIGN PATENT DOCUMENTS

EP 2557830 A1 2/2013
WO 2009149100 A1 12/2009
(Continued)

OTHER PUBLICATIONS

Agboma, et al., "Quality of experience management in mobile content delivery systems." Telecommunication Systems 49.1 (2012): 85-98.
(Continued)

*Primary Examiner* — Mang Hang Yeung
(74) *Attorney, Agent, or Firm* — Guntin & Gust, PLC; Jay Anderson

(57) ABSTRACT

Aspects of the subject disclosure may include, for example, a method in which a processing system identifies a plurality of performance indicators comprising device performance indicators for a plurality of communication devices on a cellular network and network performance indicators for the
(Continued)

cellular network. The method also includes obtaining historical data regarding the plurality of performance indicators for each of a series of time points during a past time period; the historical data for each of the plurality of performance indicators form an array of values for that performance indicator. The method further includes generating from each array a set of inputs to an algorithm for predicting a throughput of the cellular network during a future time period; the set of inputs comprises quantiles of the array, and the algorithm comprises a machine learning algorithm. Other embodiments are disclosed.

20 Claims, 31 Drawing Sheets

(51) Int. Cl.
*H04B 17/391* (2015.01)
*H04L 43/0888* (2022.01)
*H04W 72/08* (2009.01)
*H04W 8/22* (2009.01)
*H04B 17/382* (2015.01)
*G06N 20/00* (2019.01)

(52) U.S. Cl.
CPC ..... *H04B 17/3913* (2015.01); *H04L 43/0888* (2013.01); *H04W 8/22* (2013.01); *H04W 72/085* (2013.01)

(58) Field of Classification Search
CPC ........ G06N 20/10; G06N 20/20; G06N 5/003; G06N 3/0445; G06N 7/005; G06N 7/02; H04L 43/0888; H04L 41/147; H04W 72/085; H04W 8/22; H04W 24/08
USPC .......................................................... 370/252
See application file for complete search history.

(56) References Cited

U.S. PATENT DOCUMENTS

| | | |
|---|---|---|
| 6,707,862 B1 | 3/2004 | Larsson |
| 7,047,309 B2 | 5/2006 | Baumann et al. |
| 7,174,178 B2 | 2/2007 | Bergel |
| 7,310,682 B2 | 12/2007 | Hatime |
| 7,415,038 B2 | 8/2008 | Ullmann et al. |
| 7,499,453 B2 | 3/2009 | Carlson et al. |
| 7,535,839 B2 | 5/2009 | Kadaba et al. |
| 7,536,469 B2 | 5/2009 | Chou et al. |
| 7,545,749 B2 | 6/2009 | Jourdain et al. |
| 7,650,421 B2 | 1/2010 | Patrick et al. |
| 7,743,183 B2 | 6/2010 | Virdi et al. |
| 7,797,723 B2 | 9/2010 | Demircin et al. |
| 8,307,108 B2 | 11/2012 | Chen et al. |
| 8,391,896 B2 | 3/2013 | Curcio et al. |
| 8,443,404 B2 | 5/2013 | Chetlur et al. |
| 8,503,336 B2 | 8/2013 | Rappaport et al. |
| 8,577,330 B2 | 11/2013 | Reagor |
| 8,644,154 B2 | 2/2014 | Vivanco et al. |
| 8,713,195 B2 | 4/2014 | Pickens et al. |
| 8,804,515 B2 | 8/2014 | Kampmann et al. |
| 8,812,673 B2 | 8/2014 | Balachandran et al. |
| 8,854,958 B2 | 10/2014 | Gell et al. |
| 8,959,244 B2 | 2/2015 | Lin et al. |
| 9,037,099 B2 | 5/2015 | Li et al. |
| 9,191,284 B2 | 11/2015 | Kordasiewicz et al. |
| 9,191,322 B2 | 11/2015 | Schlack et al. |
| 9,306,994 B2 | 4/2016 | Gahm et al. |
| 9,331,944 B2 | 5/2016 | Swenson et al. |
| 9,344,476 B2 | 5/2016 | Kampmann et al. |
| 9,438,393 B2 | 9/2016 | Kobayashi et al. |
| 9,462,032 B2 | 10/2016 | Lieber |
| 9,485,289 B2 | 11/2016 | Zhu et al. |
| 9,496,984 B2 | 11/2016 | Christoffersson et al. |
| 9,503,384 B1 | 11/2016 | Oliveira et al. |
| 9,553,803 B2 | 1/2017 | Xiao et al. |
| 9,608,934 B1 | 3/2017 | Kalman et al. |
| 9,635,080 B2 | 4/2017 | Karlsson et al. |
| 9,654,361 B2 | 5/2017 | Vasseur et al. |
| 9,661,515 B2 | 5/2017 | Lord et al. |
| 9,699,489 B2 | 7/2017 | Iwamura |
| 9,756,112 B2 | 9/2017 | Jana et al. |
| 9,763,137 B2 | 9/2017 | Allanki et al. |
| 9,775,160 B2 | 9/2017 | Schmidt |
| 9,800,912 B2 | 10/2017 | Phillips et al. |
| 9,832,503 B2 | 11/2017 | Phillips |
| 9,838,893 B2 | 12/2017 | Grinshpun et al. |
| 9,979,663 B2 | 5/2018 | Robitaille |
| 9,992,690 B2 | 6/2018 | Butchko et al. |
| 10,062,036 B2 | 8/2018 | Mermoud et al. |
| 10,097,404 B2 | 10/2018 | Yadav et al. |
| 10,397,123 B2 | 8/2019 | Jana et al. |
| 10,595,191 B1 | 3/2020 | Mueller |
| 2003/0086514 A1 | 5/2003 | Ginis et al. |
| 2004/0259555 A1 | 12/2004 | Rappaport et al. |
| 2005/0124347 A1 | 6/2005 | Hosein |
| 2006/0003767 A1 | 1/2006 | Kim et al. |
| 2006/0067214 A1 | 3/2006 | Ramachandra |
| 2006/0121908 A1 | 6/2006 | Kikinis |
| 2006/0256130 A1 | 11/2006 | Gonzalez |
| 2007/0002743 A1 | 1/2007 | Fan |
| 2007/0153916 A1 | 7/2007 | Demircin et al. |
| 2009/0064242 A1 | 3/2009 | Cohen et al. |
| 2010/0121977 A1 | 5/2010 | Kontola et al. |
| 2010/0312905 A1 | 12/2010 | Sandmann et al. |
| 2011/0119370 A1 | 5/2011 | Huang et al. |
| 2012/0004960 A1 | 1/2012 | Ma et al. |
| 2012/0005365 A1 | 1/2012 | Ma et al. |
| 2012/0157106 A1 | 6/2012 | Wang et al. |
| 2012/0157147 A1 | 6/2012 | Christoffersson et al. |
| 2012/0257671 A1 | 10/2012 | Brockmann et al. |
| 2012/0265892 A1 | 10/2012 | Ma et al. |
| 2012/0331106 A1 | 12/2012 | Ramamurthy et al. |
| 2013/0007831 A1 | 1/2013 | Wu et al. |
| 2013/0035107 A1 | 2/2013 | Chan et al. |
| 2013/0094388 A1 | 4/2013 | Furuskaer et al. |
| 2013/0133011 A1 | 5/2013 | Chhaochharia et al. |
| 2013/0263167 A1 | 10/2013 | Parthasarathy et al. |
| 2013/0322242 A1 | 12/2013 | Swenson et al. |
| 2014/0082192 A1 | 3/2014 | Wei |
| 2014/0098697 A1 | 4/2014 | Wang et al. |
| 2014/0146693 A1 | 5/2014 | Chetlur et al. |
| 2016/0014620 A1 | 1/2016 | Narayanan et al. |
| 2016/0028647 A1 | 1/2016 | Ramakrishnan et al. |
| 2016/0044133 A1* | 2/2016 | Gibbon ............ H04W 52/0216 709/219 |
| 2016/0135076 A1 | 5/2016 | Grinshpun et al. |
| 2016/0234078 A1* | 8/2016 | Jana .................... H04L 47/823 |
| 2016/0261514 A1 | 9/2016 | Gopinathan et al. |
| 2016/0301770 A1 | 10/2016 | Marra et al. |
| 2016/0353299 A1 | 12/2016 | Sayeed et al. |
| 2016/0366565 A1 | 12/2016 | Fjelberg et al. |
| 2017/0054648 A1 | 2/2017 | Ngo-Tan et al. |
| 2017/0085950 A1 | 3/2017 | Halepovic |
| 2017/0149690 A1 | 5/2017 | Le Rudulier et al. |
| 2017/0202000 A1 | 7/2017 | Fu et al. |
| 2017/0244639 A1 | 8/2017 | Szilagyi et al. |
| 2017/0331752 A1 | 11/2017 | Jana |
| 2018/0027039 A1 | 1/2018 | Moorthy et al. |
| 2018/0027130 A1 | 1/2018 | Yermakov et al. |
| 2018/0054377 A1 | 2/2018 | Polychronis |
| 2018/0103283 A1 | 4/2018 | Liu et al. |
| 2018/0137412 A1 | 5/2018 | Nikkhah et al. |
| 2018/0139261 A1 | 5/2018 | Sintorn et al. |
| 2018/0167179 A1* | 6/2018 | Huang ................ H04W 72/082 |
| 2018/0176624 A1 | 6/2018 | Phillips et al. |
| 2018/0234320 A1 | 8/2018 | Paulraj et al. |
| 2018/0295056 A1 | 10/2018 | Xiao et al. |
| 2018/0310258 A1 | 10/2018 | Goria et al. |
| 2019/0238461 A1 | 8/2019 | Miller et al. |
| 2019/0334794 A1 | 10/2019 | Halepovic et al. |
| 2019/0334824 A1 | 10/2019 | Jana et al. |

(56) References Cited

U.S. PATENT DOCUMENTS

| | | |
|---|---|---|
| 2020/0075032 A1 | 3/2020 | Joseph et al. |
| 2020/0076520 A1 | 3/2020 | Jana et al. |
| 2020/0186430 A1 | 6/2020 | Halepovic et al. |
| 2020/0204979 A1 | 6/2020 | Mueller |
| 2020/0296442 A1 | 9/2020 | Halepovic |
| 2021/0051073 A1 | 2/2021 | Halepovic et al. |
| 2021/0184979 A1 | 6/2021 | Jana et al. |

FOREIGN PATENT DOCUMENTS

| | | |
|---|---|---|
| WO | 2010060106 A1 | 5/2010 |
| WO | 2010085043 A2 | 7/2010 |
| WO | 2017058247 A1 | 4/2017 |
| WO | 2017084723 A1 | 5/2017 |
| WO | 2017127000 A1 | 7/2017 |
| WO | 2017166119 A1 | 10/2017 |
| WO | 2018082988 | 5/2018 |

OTHER PUBLICATIONS

Arestrom, Erik, "Flow Classification of Encrypted Traffic Streams using Multifractal Features", https://liu.diva-portal.org/smash/get/diva2:1220169/FULLTEXT01.pdf, Linkoping University,, 2018.

Choi, Sunghyun et al., "Predictive and Adaptive Bandwidth Reservation for Hand-Offs in QoS-Sensitive Cellular Networks", ACM SIGCOMM Computer Communication Review. vol. 28. No. 4. ACM, 1998., 1998, 12 pages.

Covell, Michele et al., "Calibration and Prediction of Streaming-Server Performance", HP Labs Tecnical Report HPL-2004-206 (2004)., 2004, 13 pages.

Elo, Hans-Filip, "Exploring web protocols for use on cellular networks: QUIC on poor network links", https://liu.diva-portal.org/smash/get/diva2:1220465/FULLTEXT01.pdf, Linkoping University, 2017.

Haakon, Riiser et al., "Bitrate and video quality planning for mobile streaming scenarios using a GPS-based bandwidth lookup service." Multimedia and Expo (ICME), 2011 IEEE International Conference on. IEEE, 2011.

He, Lijun et al., "Content and buffer status aware packet scheduling and resource management framework for video streaming over LTE system", EURASIP Journal on Image and Video Processing 2017.1, 73, 2017.

Kamel, Ammar M., "Client-Based QoS Monitoring and Evaluation Architecture for Network Infrastructure and Services", Western Michigan University ScholarWorks at WMU, Dec. 2013, 130 pages.

Krishnamoorthi, Vengatanathan et al., "Slow but Steady: Cap-based Client-Network Interaction for Improved Streaming Experience", Authors Version—Proceedings of the IEEE/ACM International Symposium on Quality of Service (IEEE/ACM IWQoS), 2018.

Krishnamoorthi, Vengatanathan et al., "Slow but Steady: Cap-based Client-Network Interaction for Improved Streaming Experience", 978-1-5386-2542-2/18 c 2018 IEEE, Jun. 2018, 10pgs.

Oyman, et al., "Quality of experience for HTTP adaptive streaming services." Communications Magazine, IEEE 50.4 (2012): 20-27.

Sun, Yi, "CS2P: Improving Video Bitrate Selection and Adaptation with Data-Driven Throughput Prediction", Proceedings of the 2016 ACM SIGCOMM Conference. ACM, 2016., 2016, 14 pages.

Tumuluru, Vamsi K. et al., "Channel status prediction for cognitive radio networks", Wireless Communications and Mobile Computing 12.10 (2012): 862-874., 2012, 13 pages.

Yanggratoke, Rerngvit et al., "Predicting Real-time Service-level Metrics from Device Statistics", KTH Technical Report TRITA-EE, 2014:053; URN:NBN:SE:KTH:DIVA-152637., Sep. 29, 2014, 9 pages.

Yin, Sixing et al., "Prediction-Based Throughput Optimization for Dynamic Spectrum Access", IEEE transactions on vehicular technology 60.3 (2011): 1284-1289., Mar. 2011, 6 pages.

Zou, Xuan K. et al., "Can accurate predictions improve video streaming in cellular networks?", Proceedings of the 16th International Workshop on Mobile Computing Systems, Feb. 2015, 6 pages.

"Home ■ Dash-Industry-Forum/dash.js Wiki ■ GitHub", https://github.com/Dash-Industry-Forum/dash.js/wiki, May 15, 2018, 5 pp.

"ISO/IEC FDIS 23009-5:2017: Information Technology—Dynamic adaptive streaming over HTTP (DASH)", Part 5: Server and network assisted DASH (SAND), 2017, 11 pp.

"ITU-T P.1203: Objective video QoE standard", https://www.itu.int/rec/T-REC-P.1203, 2016.

"VQEG: Objective video quality assessment", https://www.its.bldrdoc.gov/vqeg/projects/audiovisual-hd.aspx, 2018, 3 pp.

Akhshabi, Saamer, et al., "Server based traffic shaping for stabilizing oscillating adaptive streaming players", Proc. ACM NOSSDAV, 2013, 4 pp.

Benno, S., et al., "Adaptive streaming: The network Has to help", Bell Lab. Tech. Journal, 2011, 7 pp.

Bentaleb, Abdelhak, "SDNDASH: Improving QoE of HTTP Adaptive Streaming Using Software Defined Networking", Proc. ACM MMSyS, 2016, 10 pp.

Bhat, Divyashri, "Network Assisted Content Distribution for Adaptive Bitrate Video Streaming", Proc. MMSys, 2017, 14 pp.

Bouten, Niels, et al., "In-Network Quality Optimization for Adaptive Video Streaming Services", IEEE Trans. on Multimedia, vol. 16, No. 8, pp. 2281-2293, 2014, 1 p.

Bouten, Niels, "QoE-Driven In-Network Optimization for Adaptive Video Streaming Based on Packet Sampling Measurements", Computer Networks, 2015, 20 pp.

Carbone, Marta et al., "Dummynet revisited", ACM SIGCOMM Computer Communication Review, vol. 40, pp. 12-20, 2010, 2010, 8 pp.

Casas, Pedro, et al., "YOUQMON: A System for Online Monitoring of YouTube QoE in Operational 3G Networks", ACM SIGMETRICS Perform. Eval. Rev., vol. 41, pp. 44-46, 2013, 4 pp.

Cofano, G., et al., "Design and Experimental Evaluation of Network-assisted Strategies for HTTP Adaptive Streaming", Proc. ACM MMSyS, 2016, 12 pp.

Dimopoulos, Georgios, et al., "Measuring Video QoE from Encrypted Traffic", Proc. IMC, 2016, 2016, 14 pp.

Dobrian, Florin, et al., "Understanding the Impact of Video Quality on User Engagement", SIGCOMM'11, Aug. 15-19, 2011, Toronto, Ontario, Canada, 2011, 12 pp.

Flach, Tobias, et al., "An Internet-Wide Analysis of Traffic Policing", University of Southern California; Google; Proc. ACM SIGCOMM, 2016, 15 pp.

Hamer, Greg, "Open Source Media Framewrok Introduction and Overview Adobe Developer Connection", https://www.adobe.com/devnet/video/articles1/osmf_overview.html, 2010, 9 pp.

Hobfeld, Tobias, et al., "Identifying QoE Optimal Adaptation of HTTP Adaptive Streaming Based on Subjective Studies", Computer Networks, 2015, 2015, 23 pp.

Houdaille, Remi, et al., "Shaping http adaptive streams for a better user experience", Proc. ACM MMSys, 2012, 4 pp.

Huang, Te-Yuan, et al., "Confused, Timid, and Unstable: Picking a Video Streaming Rate is Hard", Stanford University; {huangty,nikhilh,brandonh,nickm,ramesh.johari}@stanford.edu, 2012, 14 pp.

Kakhki, Arash Molavi, et al., BingeOn Under the Microscope: Understanding T-Mobile's Zero-Rating Implementation, Proc. Internet-QoE Workshop, 2016, 6 pp.

Kleinrouweler, Jan Willem, et al., "Delivering Stable High-Quality Video: An SDN Architecture with DASH Assisting Network Elements", Proc. ACM MMSyS, 2016, 10 pp.

Krishnamoorthi, Vengatanathan et al., "978-1-5386-2542-2/18/$31.00 2018 IEEE", Slow but Steady: Cap-based Client-Network Interaction for Improved Streaming Experience, 2018, 10pgs.

Krishnamoorthi, Vengatanathan, "Helping Hand or Hidden Hurdle: Proxy-assisted HTTP-based Adaptive Streaming Performance", IEEE Mascots, 2013, 10 pp.

Krishnamoorthi, Vengatanathan, "Buffest: Predicting Buffer Conditions and Realtime Requirements of HTTP(S) Adaptive Streaming Clients", Proc. ACM MMSys,, 2017, 13 pp.

(56) References Cited

OTHER PUBLICATIONS

Krishnamoorthi, Vengatanathan, et al., "Quality-adaptive Prefetching for Interactive Branched Video using HTTP-based Adaptive Streaming", ACM 978-1-4503-3063, 2014, 10 pp.

Krishnan, S. Shunmuga, et al., "Video Stream Quality Impacts Viewer Behavior: Inferring Causality Using Quasi-Experimental Designs", IMC'12, Nov. 14-16, 2012, Boston, Massachusetts, USA, 2012, 14 pp.

Mangla, Tarun, et al., "MIMIC: Using passive network measurements to estimate HTTP-based adaptive video QoE metrics", Proc. IEEE/IFIP TMA, 2017, 6 pp.

Mangla, Tarun, et al., "VideoNOC: Assessing Video QoE for Network Operators Using Passive Measurements", Proc. MMSys, Jun. 12, 2018, 12 pp.

Petrangeli, Stefano, et al., "Software-Defined Network-based Prioritization to Avoid Video Freezes in HTTP Adaptive Streaming", Int. Journ. of Netw. Management, 2016, 23 pp.

Qadir, Qahhar Muhammad, et al., "Mechanisms for QoE optimisation of Video Traffic: A review paper", Australasian Journal of Information, Communication Technology and Applications, 2015, 18 pp.

Rao, Ashwin, et al., "Network Characteristics of Video Streaming Traffic", ACM CoNEXT, 2011, 12 pp.

Riiser, Haakon, et al., "Commute Path Bandwidth Traces from 3G Networks: Analysis and ApplicationsCommute Path Bandwidth Traces from 3G Networks: Analysis and Applications", Proc. ACM MMSys, 2013, 5 pp.

Spiteri, Kevin, et al., "BOLA: Near-Optimal Bitrate Adaptation for Online Videos", IEEE INFOCOM, 2016, 12 pp.

Spiteri, Kevin, et al., "From Theory to Practice: Improving Bitrate Adaptation in the DASH Reference Player", 2018 Copyright held by the owner/author(s). Publication rights licensed to Association for Computing Machinery. ACM ISBN 978-1-4503-5192-8/18/06. https://doi.org/10.1145/3204949.3204953, Jun. 12, 2018, 15 pp.

Sun, Yi, et al., "CS2P: Improving Video Bitrate Selection and Adaptation with Data-Driven Throughput Prediction", Proc ACM SIGCOMM, 2016, 14 pp.

Vleeschauwer, D. D., et al., "Optimization of http adaptive streaming over mobile cellular networks", Proc. IEEE INFOCOM, 2013, 2 pp.

Wu, Tingyao, et al., "Network-based video freeze detection and prediction in HTTP adaptive streaming", Comp. Comm., vol. 99, pp. 37-47, 2017, 3 pp.

Zahran, Ahmed H., "SAP: Stall-Aware Pacing for Improved DASH Video Experience in Cellular Networks", Proc. ACM MMSys, 2017, 15 pp.

Zhi, Li, et al., "Probe and Adapt: Rate Adaptation for HTTP Video Streaming at Scale", IEEE Journal on Selected Areas in Communications, 2014, 15 pp.

\* cited by examiner

201

204

PxF12
Comparison between different data summarization techniques

The ACF of throughput vs. time lag (sample trace)

The average ACF of throughput vs. time lag across all traces (active experiment)

SYSTEM AND METHOD FOR THROUGHPUT PREDICTION FOR CELLULAR NETWORKS

CROSS REFERENCE TO RELATED APPLICATIONS

This application is a continuation of U.S. application Ser. No. 16/118,796, filed Aug. 31, 2018, which is incorporated herein by reference in its entirety.

FIELD OF THE DISCLOSURE

The subject disclosure relates to cellular communication networks, and more particularly to a system and method for predicting throughput on a cellular network.

BACKGROUND

Mobile device traffic on cellular networks continues to increase, particularly for video and interactive applications. In general, different applications present different requirements; for example, while video traffic has high requirements concerning throughput, interactive applications require low delay from the network. Network throughput experienced by devices can fluctuate frequently due to several factors including rapidly changing radio channel conditions and varying cell load resulting from device mobility.

BRIEF DESCRIPTION OF THE DRAWINGS

Reference will now be made to the accompanying drawings, which are not necessarily drawn to scale, and wherein:

FIGS. 2E-1, 2E-2, 2E-3 are graphs showing comparisons of data summarization techniques, in accordance with embodiments of the disclosure.

FIGS. 2G-1, 2G-2, 2G-3 are graphs showing residual error and autocorrelation coefficients for key performance indicator (KPI) data, in accordance with embodiments of the disclosure.

FIGS. 2H-1, 2H-2 are graphs showing measured throughput for mobile and static devices, in accordance with embodiments of the disclosure.

FIG. 3 is a block diagram illustrating an example, non-limiting embodiment of a virtualized communication network in accordance with various aspects described herein.

DETAILED DESCRIPTION

Figure 1:
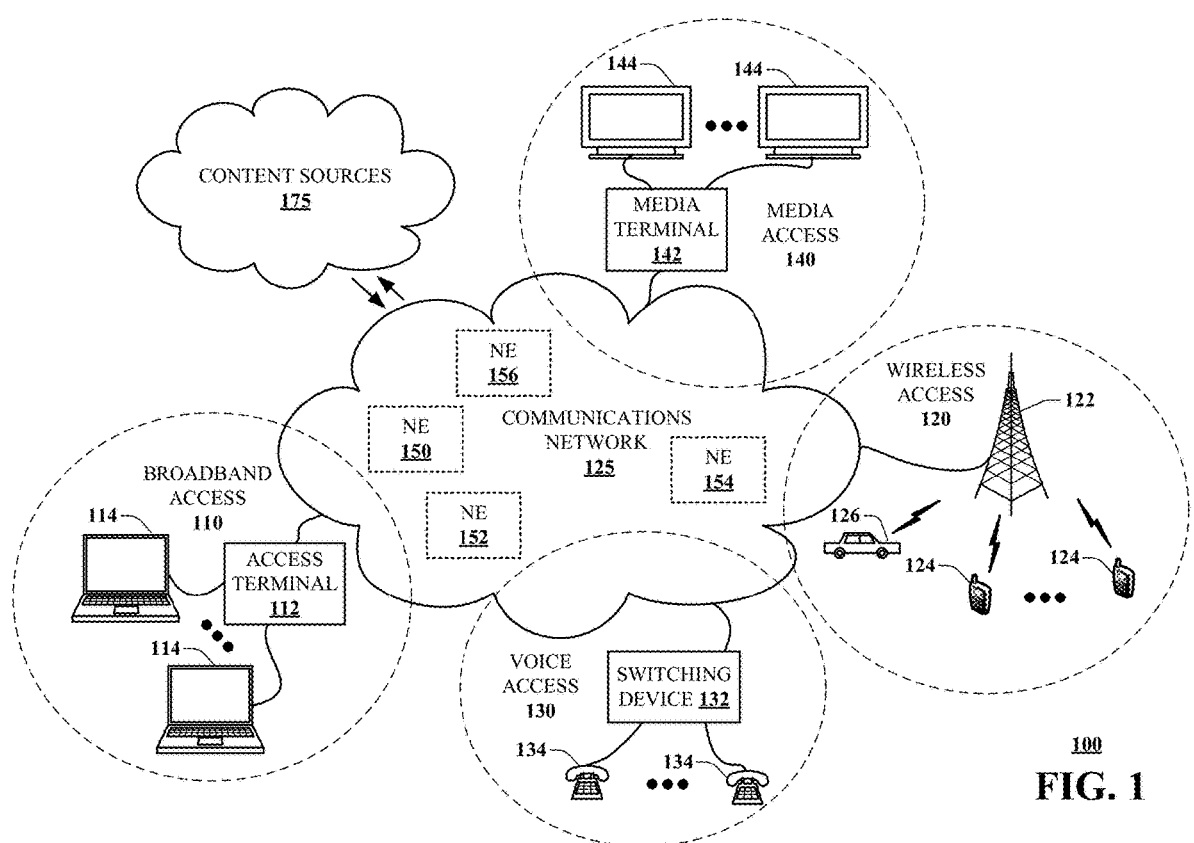
FIG. 1 is a block diagram illustrating an example, non-limiting embodiment of a communications network in accordance with various aspects described herein.

The support of Science Foundation Ireland (SFI) under Research Grant 13/IA/1892 is acknowledged.

The subject disclosure describes, among other things, illustrative embodiments for predicting throughput on a cellular network using a machine learning (ML) algorithm. According to embodiments of the disclosure, throughput in cellular networks can be predicted by leveraging key metrics associated with the radio channel, referred to herein as Key Performance Indicators (KPIs). Different KPIs are typically measured on different schedules, ranging from several times per second to once per several seconds; the frequency of measurement of a KPI is referred to as its granularity. The device environment (device-based KPIs) and the network (base station) environment (network-based KPIs) are captured over a specific time period (referred to herein as KPI history), and a heuristic algorithm combining these metrics is used to predict network throughput over a future time period (ending at a time referred to herein as the throughput horizon). Other embodiments are described in the subject disclosure.

In particular, disclosed herein is a technique for representation of a KPI history (also referred to herein as KPI summarization) that provides improved prediction accuracy in an environment with low-granularity KPIs. Furthermore, in accordance with the disclosure, the effect of history length on ML model learning throughput patterns can be quantified. As detailed below, different ML algorithms and their performance affect throughput prediction; increasing the prediction horizon helps in reducing prediction error.

One or more aspects of the subject disclosure include a method in which a processing system identifies a plurality of performance indicators regarding a cellular network; the performance indicators can include device performance indicators for a plurality of communication devices on the cellular network and network performance indicators for the cellular network. The processing system obtains historical data regarding the plurality of performance indicators for each of a series of time points during a past time period having a predetermined length; the historical data for each of the plurality of performance indicators forms an array of values for that performance indicator. The processing system generates, from each array, a set of inputs to an algorithm for predicting a throughput of the cellular network during a future time period having a predetermined length; the set of inputs includes a statistical summarization of the array, and the algorithm comprises a machine learning algorithm. The processing system obtains a predicted throughput for the cellular network based on the algorithm.

One or more aspects of the subject disclosure include a device comprising a processing system including a processor and a memory that stores executable instructions; the instructions, when executed by the processing system, facilitate performance of operations. The operations comprise identifying a plurality of performance indicators regarding a cellular network; the performance indicators can include device performance indicators for a plurality of communication devices on the cellular network and network performance indicators for the cellular network. The operations also comprise obtaining historical data regarding the plurality of performance indicators for each of a series of time points during a past time period having a predetermined length; the historical data for each of the plurality of performance indicators form an array of values for that performance indicator. The operations further comprise generating from each array a set of inputs to an algorithm for predicting an average throughput of the cellular network during a future time period having a predetermined length; the set of inputs comprises a statistical summarization of the array, and the algorithm comprises a machine learning algorithm.

One or more aspects of the subject disclosure include a machine-readable medium comprising executable instructions that, when executed by a processing system including a processor, facilitate performance of operations. The operations comprise identifying a plurality of performance indicators regarding a cellular network; the performance indicators can include device performance indicators for a plurality of communication devices on the cellular network and network performance indicators for the cellular network. The operations also comprise obtaining historical data regarding the plurality of performance indicators for each of a series of time points during a past time period; the historical data for each of the plurality of performance indicators form an array of values for that performance indicator. The operations further comprise generating from each array a set of inputs to an algorithm for predicting a throughput of the cellular network during a future time period; the set of inputs comprises a statistical summarization of the array, and the algorithm comprises a machine learning algorithm.

The following aspects of the disclosure are discussed in detail below:

When relying only on device-based KPIs and one-second granularity, a KPI summarization technique using quantile values decreases the 90th percentile of absolute error in throughput prediction from 51% to 22%, compared to the standard approach of feeding data directly without any modification as an input to an ML algorithm. Furthermore, with 250 ms KPIs granularity, 90% of error values are below 6%. These results are based on a mobile user device scenario. In the static case, this error is even lower, with 90th percentile below 10% for one-second KPI granularity.

The effects of different KPIs are quantified, showing that that use of network-based KPIs improves the throughput prediction accuracy by 21% in comparison to relying only on device-based KPIs.

Increasing the history length from 1 to 20 seconds of measured KPIs helps in improving prediction accuracy by 50% on average. Also, increasing horizon up to 12 seconds has a similar effect, resulting in an increase of prediction accuracy by 16%.

Key causes (edge conditions and handover events) of prediction errors in a mobile device scenario, due to the mobility pattern of a user, are identified.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
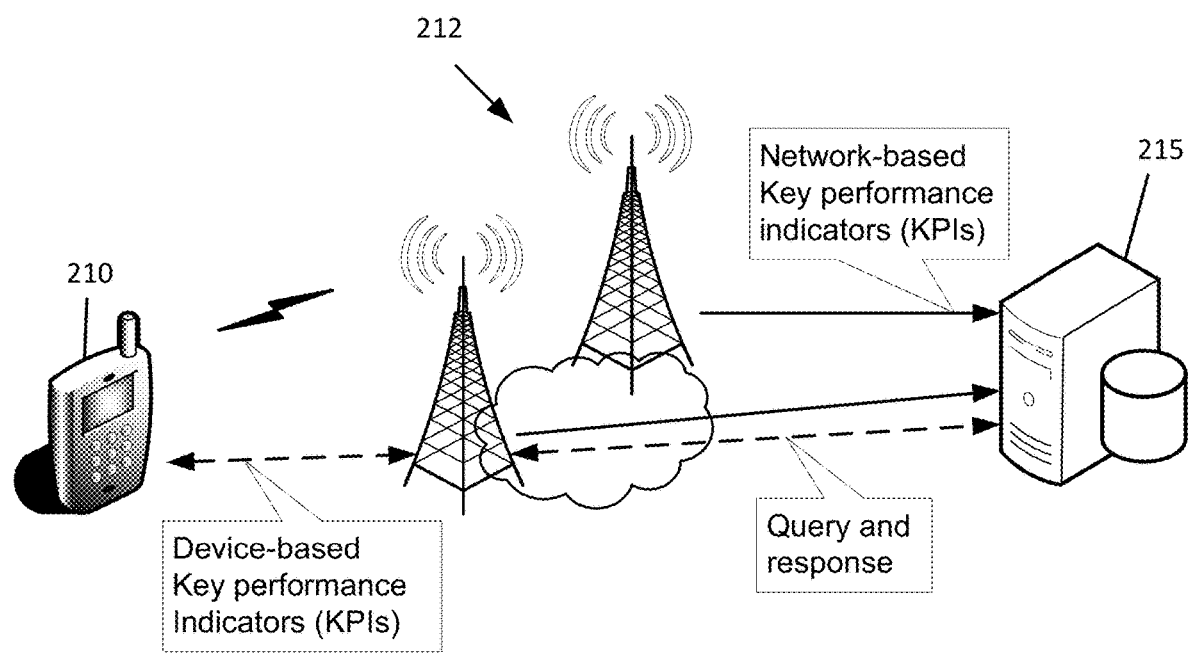
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 201 functioning within the communication network of FIG. 1 in accordance with various aspects described herein. Mobile device 210 communicates with a cellular network having multiple cells 212, which are in communication with a network administrator 215. In this embodiment, mobile device 210 can transmit key performance indicator (KPI) data over the network in response to queries from the network administrator. The network administrator also collects KPI data regarding the performance of the network. Examples of device-based KPIs include the device's instantaneous radio channel quality indicator (CQI), discontinuous transmission ratio (DTX), signal-to-interference and noise ratio (SINR), reference signal received power (RSRP), and reference signal received quality (RSRQ). Network-based KPIs can include the level of user demand at each cell and average channel conditions (for example, values for CQI, RSRP, SINR and RSRQ for current users of the cell).

Machine Learning Prediction Algorithms

Several different regression algorithms, particularly machine learning (ML) algorithms, have been investigated with regard to throughput prediction, as well as the impact of different KPIs, history length, prediction horizon, and frequency of KPI gathering.

Regardless of the ML algorithm, the average throughput is predicted rather than instantaneous throughput. This is motivated by the needs of real applications that can make use of throughput guidance. For example, in a video player downloading chunks of length x, how the throughput fluctuates within those x seconds is of little concern for the player. Of more interest is the average throughput that the video player will observe in the next x seconds, as this will drive the behavior of the video adaptation algorithm. More generally, any statistical indicator of network throughput may be predicted. The time length x is called the prediction horizon and is a parameter of the ML algorithm.

Figure 2B:
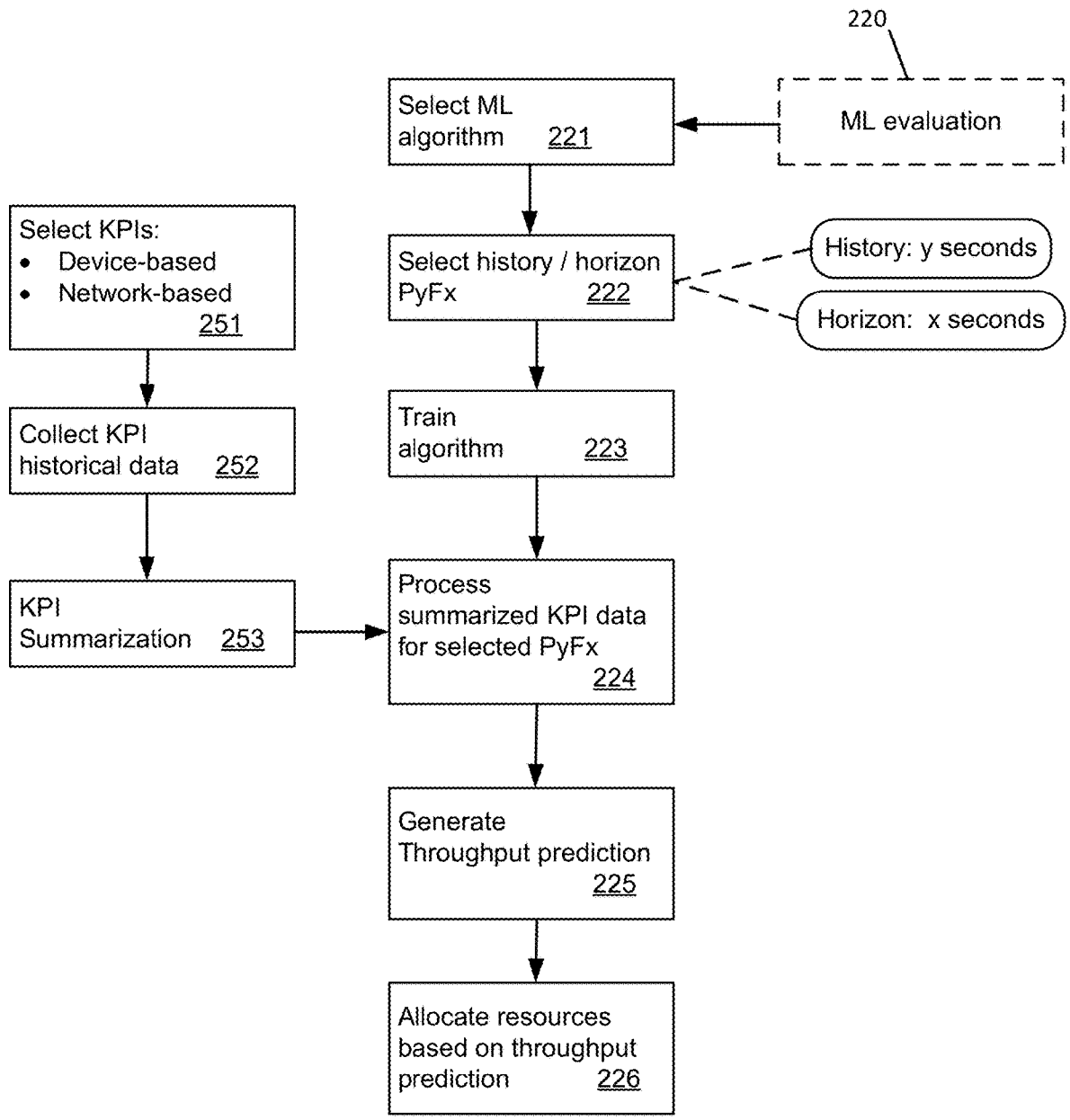
FIGS. 2B and 2C are flowcharts depicting illustrative embodiments of methods in accordance with various aspects described herein.

FIG. 2B is a flowchart illustrating a procedure for throughput prediction using a machine learning algorithm executing on a system functioning within the communication network of FIG. 1, in accordance with various aspects described herein. An evaluation of different ML algorithms may be performed (step 220). An algorithm is selected (step 221), and the history and horizon times for the KPIs are determined (step 222). As detailed below, the KPI history length (the time over which historical data is collected) and the prediction horizon (the endpoint of the future time for which the prediction is made) are important parameters for the prediction algorithm. The algorithm is trained using available device and network data (step 223).

In this embodiment, KPIs are selected to provide data regarding both device performance and network performance (step 251). For each KPI, performance data is collected for the selected history time length (step 252). The number of measurements taken during this time period can vary from one KPI to another; a "high-granularity" KPI may be measured several times per second, while a "low-granularity" KPI may be measured only once in several seconds.

A summarization procedure is then performed on the historical KPI data (step 253). The summarization procedure provides an array of values for each KPI which is input to the ML algorithm. The algorithm processes the summarized KPI data (step 224) to predict a future value for the throughput (step 225). The system then provides guidance, based on the prediction, to a network element, a server (e.g. a host server) connected to the network, a client, and/or an application executing on a device connected to the network. In this embodiment, the system allocates resources based on the prediction (step 226) to improve performance of the cellular network. In an embodiment, throughput prediction for a cell is performed at a base station serving that cell, and the base station allocates resources to adapt to changing network conditions.

In various embodiments detailed below, the following ML algorithms were considered: random forest (RF), support vector machines (SVM), gradient tree boosting (GB), and neural network (NN). These algorithms were chosen because they represent the state-of-the-art machine learning algorithms and are popular choices across different research fields.

RF represents an ensemble/boosting learning method for regression and classification tasks. RF works by growing a collection of decision trees (weak learners) and then making a prediction by taking the mean of individual trees. This reduces overfitting because each tree is constructed on a randomly selected subset of features. They are further de-correlated (which minimizes the overfitting) by considering a random subset of features for each split of the decision tree.

Similar to RF, GB also represents an ensemble algorithm, with the idea to build a model iteratively, where at each stage, a 'weak learner' is added to improve the existing model.

SVM is based on constructing hyperplanes for making decision boundaries that separate points of different classes. For making separation easier, input features can be transformed by appropriate functions called kernels. For SVM, parameters tuning represents the main drawback. A conventional technique, grid search can be used to automatically search for optimal parameters, but it is time-consuming.

Multilayer perceptron (MLP), also known as feed-forward neural networks, represents a deep learning model. It consists of multiple layers, with input forming the first layer and output being the last layer. From each layer, a linear combination of all the values is taken, an activation function is applied, and the result is sent to the next layer. The goal of the learning algorithm is to find the appropriate weights used in the linear combination.

The ML-based throughput prediction algorithms described above were compared using two key metrics: the absolute value of residual error (ARE) and coefficient of determination (CoD) R2. ARE is the ratio of absolute residual error and actual throughput, where the residual error is the difference between actual and predicted throughput. The R2 score (having a range 0-1) is a measure of the goodness of a model compared to a naive model. e.g., an R2 score of 0.8 (respectively 0.9) implies that the naive model has five (respectively ten) times higher error than the model in question. R2 is defined by the following equation:

$$R^2 = 1 - \frac{\sum_{i=0}^{N}(R_i - \hat{R}_i)^2}{\sum_{i=0}^{N}(R_i - \overline{R})^2}, \quad (1)$$

where N is the number of samples in the test dataset (history length), Ri is actual throughput, R^i predicted throughput, and R⁻ the average throughput for the test dataset.

When evaluating ML algorithms, bias and variance are also analyzed. Bias may be quantified using the training error. After training an ML model, the model is tested on the training data. If the error is very low (e.g., close to zero for the ARE metric), then the produced model correctly represents the training data; it can then be concluded that the model has little or no bias. Otherwise, the model is said to have a high bias.

Variance refers to the ability of a trained model to represent unseen data. Such variance may be quantified using cross-validation (CV) data to test a model. If the resulting error is low, then the model is said to have a low variance implying that it can successfully predict new values on unknown data. High variance indicates that the model overfits the training data, and is thus only capable of predicting values based on data similar to the training data. Finally, if training and CV error are both low, then the model has low bias and low variance—a desirable outcome.

Unless otherwise noted, each ML algorithm was tuned and its quality estimated using 10-fold cross-validation. Cross-validation is computationally more expensive than alternative techniques like "holdout", but it guarantees higher accuracy.

In our experiments, ML algorithms leverage RAN KPIs to derive throughput predictions. As mentioned previously, such KPIs are either device-based, i.e., collected at a user's device, or network-based, i.e., collected by the (cellular) network.

The combination of channel conditions and the current state of a cell largely determines the number of allocated resources blocks and thus throughput at the device side. To capture these dimensions, channel related metrics (SNR, CQI, RSRP and RSRQ) were collected, enhanced with a device physical speed (km/h) and application throughput. The current state of a cell can be inferred from cell load and additional information such as demand of other users connected to the same cell. This demand can be represented by the average throughput of other users, and average channel conditions (regarding CQI, RSRP, SNR and RSRP). Because devices do not have access to this latter information, such conditions are referred to as network-based KPIs. The following network-based KPIs are assumed to be measurable:

Competing throughput: average throughput of the devices connected to a given cell Competing CQIs, RSRP, RSRQ and SNR: average per KPI value of all devices connected to the same cell Load: number of devices connected to the same cell and PRB utilization Note that for competing device metrics, the average value across all devices is used, as the number of users per cell changes with user mobility.

KPI Summarization

Throughput may be predicted by leveraging the full history of each KPI (termed "raw" in the list below). Alternatively, a KPI may be summarized by its average value. However, the average and entire history can be affected by outliers. Having outliers in real data is an unavoidable difficulty.

Alternative ways of representing and summarizing a KPI history can involve using the inter-quartile range, a standard measure used in statistics, with inter-quartile range points for history representation of each KPI. This range is a measure of spread of data. One of the main characteristics of this range is mostly unaffected by outliers. Capturing this range for sample time-series of a given KPI permits efficient analysis of the KPI's pattern.

Let $kpi_i^n$ represent a KPI n at time i. Raw and quantile summarization techniques are as follows:

Raw: Use $(kpi_{i-1}^n, kpi_{i-2}^n, kpi_{i-3}^n, \ldots)$ for every for every n as input to the prediction model.

Quantile: for a $(kpi_{i-1}^n, kpi_{i-2}^n, kpi_{i-3}^n, \ldots)$ array of values, calculate the following metrics: 25th percentile, 50th percentile, 75th percentile, and 90th percentile of the input array. In an embodiment, the metrics further include the mean of the input array. This may be understood as capturing a discretized cumulative distribution function (CDF) of the history interval for every KPI.

Figure 2C:
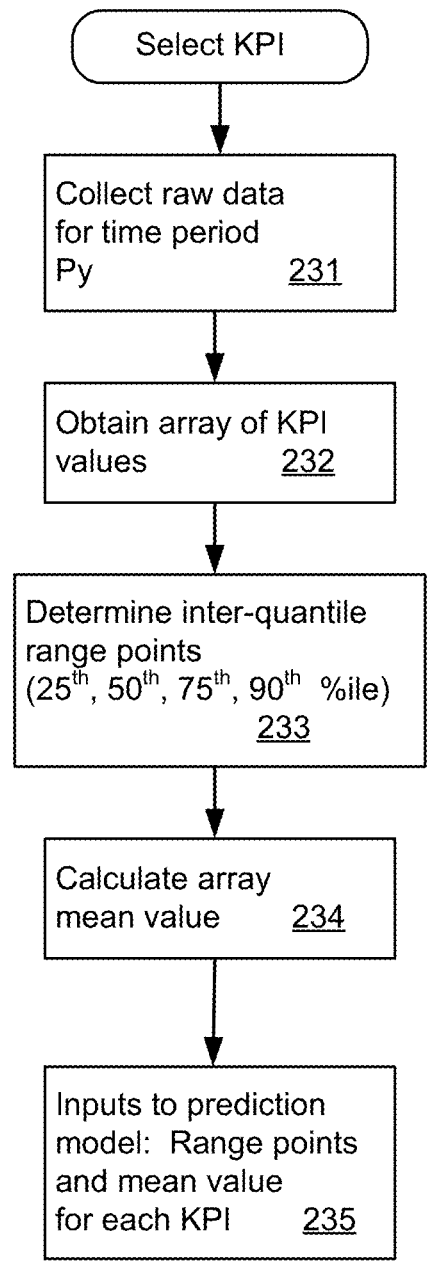

FIG. 2C depicts an illustrative embodiment of a method for summarizing KPI data, in accordance with various aspects described herein. For each KPI, raw data is collected for a past time period of predetermined length (step 231). The raw data can then be arranged as an array of values (step 232). In this embodiment, the array is analyzed to yield four values corresponding to the 25th, 50th, 75th and 90th percentile for the array (step 233). In this embodiment, the mean value for the array is also calculated (step 234). Each KPI is thus represented by a set of five values (the interquantile range points and the mean). These values are input to the ML prediction algorithm (step 235).

Regardless of the number of range points used in the summarization procedure, the respective KPIs in this embodiment are represented by sets of values having a uniform size, even though the sets of raw data values may vary widely for different KPIs.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Evaluating ML Algorithms: Methodology

Device-based and network-based KPIs were collected via active experiments in a real LTE network. Several cells of a large US cellular operator were instrumented for network-based KPI collection. Active experiments were conducted from instrumented devices (phone and laptop) connected to the instrumented cells. The experiments included repetitively downloading a file while varying several parameters such as file size and the number of TCP connections used. Both static and mobile scenarios were considered. In the mobile scenario, the device mobility consists of a superposition of moving and stopping patterns on a highway with speed that varies between 0 and 130 kmph. The device-based and network-based KPIs were collected as follows:

Device-based KPIs: These KPIs are available from the Android OS through the Google channel API and does not require any rooting process. KPI collection has a one-second resolution, on average; this low-resolution approach is representative of how real device-based KPIs can be collected today. However, a tool such as the Qualcomm Diagnostic Tool (QXDM™) is capable of capturing device-based KPIs at high resolution (hundreds of ms) directly from the hardware. QXDM is a proprietary tool working only with Qualcomm chipsets and thus not universally applicable. Nevertheless, a limited set of results based on fine-granular KPIs is given below as an example of what can be achieved if high-resolution KPIs are available. Over sixty traces for different mobility patterns were collected, with an average duration of 15 minutes per trace.

Network-based KPIs: These are collected by a set of instrumented cells to which the phone and laptop were connected. For a given device, a cell is instrumented to log its network-based KPIs. Certain KPIs, e.g., cell site load and PRB utilization, are reported with a fixed periodicity and other 'session level KPIs', e.g., CQI, are reported for an entire session whenever the LTE bearer tears down. To tear down a bearer, one simply needs to idle a device activity for a few seconds. Accordingly, the devices were instrumented to initiate a download (active period) and then pause for a few seconds to cause a bearer tear down event (idle period). Selecting the length of active periods requires balancing among competing concerns. Because only one value of any "session level KPI" was obtained for the entire active period, the active periods were not made too long. At the same time, it was desirable to consider prediction horizons of reasonable lengths. An active period of 16 seconds was used.

TABLE 1

Types of Collected Data

| Data Source | Summary |
| --- | --- |
| Android API | Medium-grained data (one sample every second) collected directly on Android phone |
| CTR | Low-grained data collected directly from the cellular operator's network. Data frequency ranges from couple of seconds to minutes. This data is combined with device-based KPIs collected on the phone. |

The Android API enables collection of device-based KPIs at medium-grained resolution. The same does not hold for cell-wide network-based KPIs such as cell load, PRB utilization, channel signal quality (e.g., RSRP and RSRQ), and application throughput of other devices served by the same base station. For example, competing RSRP and RSRQ, are calculated based on RSRP and RSRQ, which are reported to the cell every few seconds (at network side) while other metrics can take up to 60 seconds, on average, regardless of active and idle periods. Also, for the history length, we use two approaches: network-based KPIs that are collected over the last sixty seconds, while device-based KPIs are collected up to eight seconds in the past. In this way, we overcome sparsity of network samples while we keep relatively higher granularity for device KPIs.

KPI Summarization: Experimental Results

An evaluation was performed of ML techniques as applied to throughput prediction in cellular networks. Unless otherwise noted, we derive one ML model per device. In comparison to using an ML model per cell/region this approach provides higher accuracy but also higher computational cost. In various embodiments described below, random forest (RF) is used as a benchmarking algorithm. We chose RF because it requires little or no tuning and it can operate with raw KPIs with no need of data transformation with respect to both normalization and scaling. Different ML algorithms have been compared as discussed further below. We find that overall, SVM and RF give best results, and have similar accuracy.

Figure 2D:
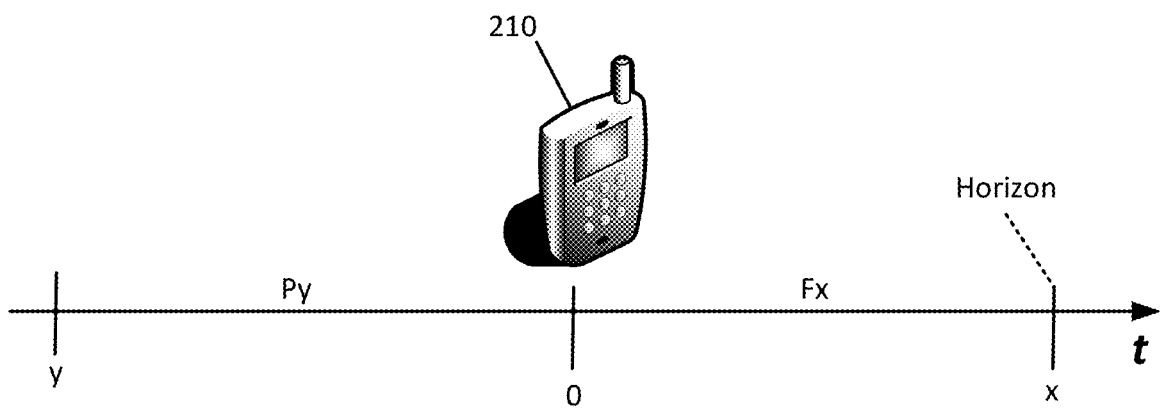
FIG. 2D schematically illustrates a timeline for collecting historical data to predict network throughput at a future time, in accordance with various aspects described herein.
Figures 1, 2E:
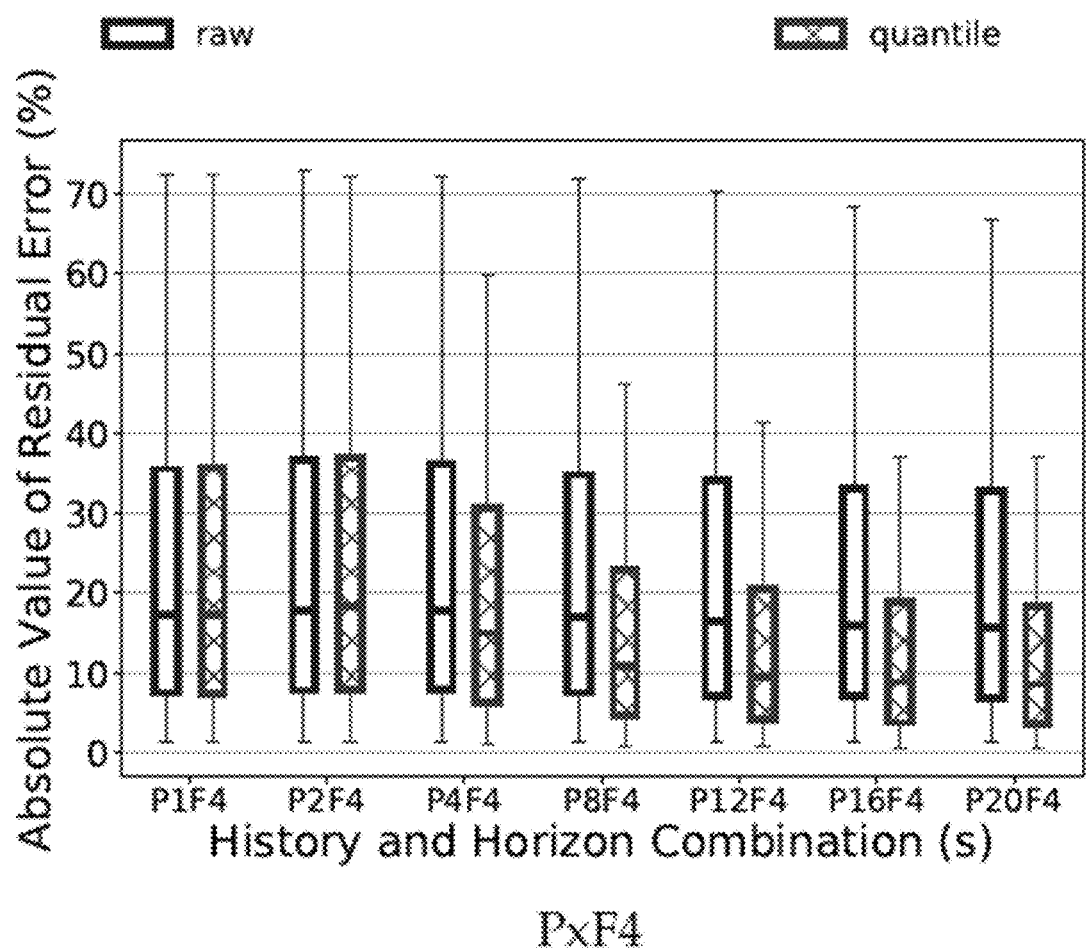

We investigate several scenarios for the combination of prediction horizon and history length. As shown in FIG. 2D, the notation PyFx, where Py (past) denotes using y seconds of historical data and Fx (future), denotes a prediction horizon of x seconds. Most results are based on device-based KPIs only and a one second granularity. We explicitly mention KPI granularity change (250 ms) and the introduction of network-based KPIs. Furthermore, a majority of experiments are done in a mobile case, as it is the most challenging environment. Due to the large set of parameters to investigate (e.g., horizon, history length, and ML algorithm), we create a funnel-based approach where we progressively fix some parameters after investigating their impact on throughput accuracy.

FIGS. 2E-1, 2E-2 and 2E-3 show the absolute value of residual error (ARE) for the raw and quantile summarization techniques and several scenarios. The notation used is (PyFx), where Py is the Past history length (between 1 to 20 seconds) and Fx is the Future prediction horizon (4, 8, and 12 seconds).

Regardless of the prediction horizon, the raw summarization technique achieves lower ARE (higher prediction accuracy) than quantile with KPI history length of fewer than five seconds. This result is intuitive: due to the one second KPI granularity, a 2 seconds history consists of only 2 values over which the computed percentiles are indeed artificial points within these 2 values. With a longer KPI history, the quantile summarization technique outperforms raw. For example, with a prediction history of 20 seconds (P20Fx) the quantile technique lowers the ARE compared to raw by 15% (75th percentile) and 30% (90th percentile). For CoD, we observe a similar trend as for ARE, e.g., a value of 0.985 for large history when using the quantile strategy which is a 0.05 boost compared to the raw strategy.

FIGS. 2E-1, 2E-2 and 2E-3 also show that throughput prediction accuracy improves when increasing the prediction horizon. At first, this result appears counter-intuitive as one would expect that predicting throughput for a near future should be easier than for the more distant future. However, this does not hold when predicting the average throughput over the next x seconds. For example, if values [x1, x2, x3, x4] are the throughput within the next four seconds with a one-second granularity, then predicting the value of x4 on its own is more challenging than predicting the value of x1. However, predicting x4 (horizon=4 seconds) is easier than predicting x2 (horizon=2 seconds), since averaging over a longer window results in smaller variance.

Figures 2, 2E:
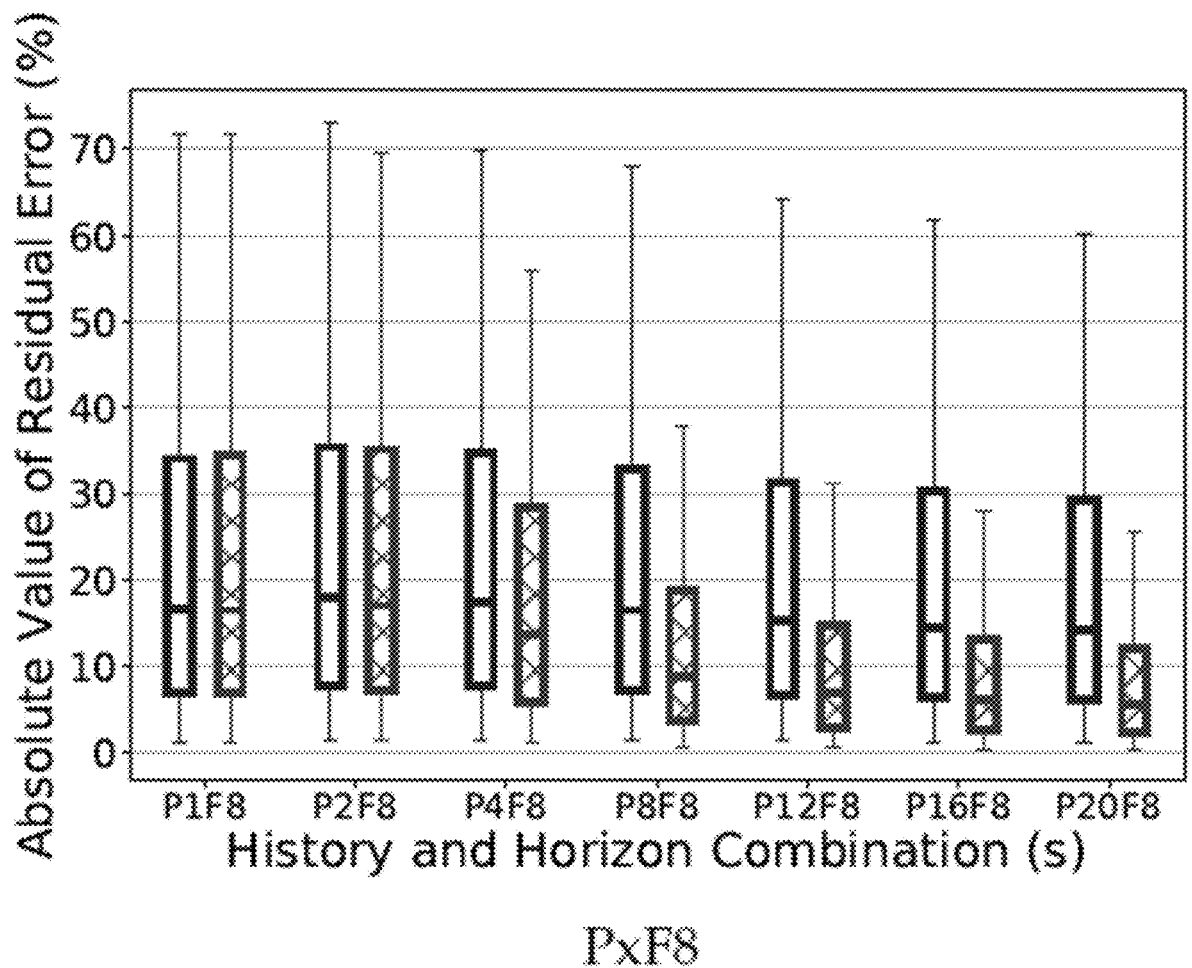
Figures 2, 2E, 3:
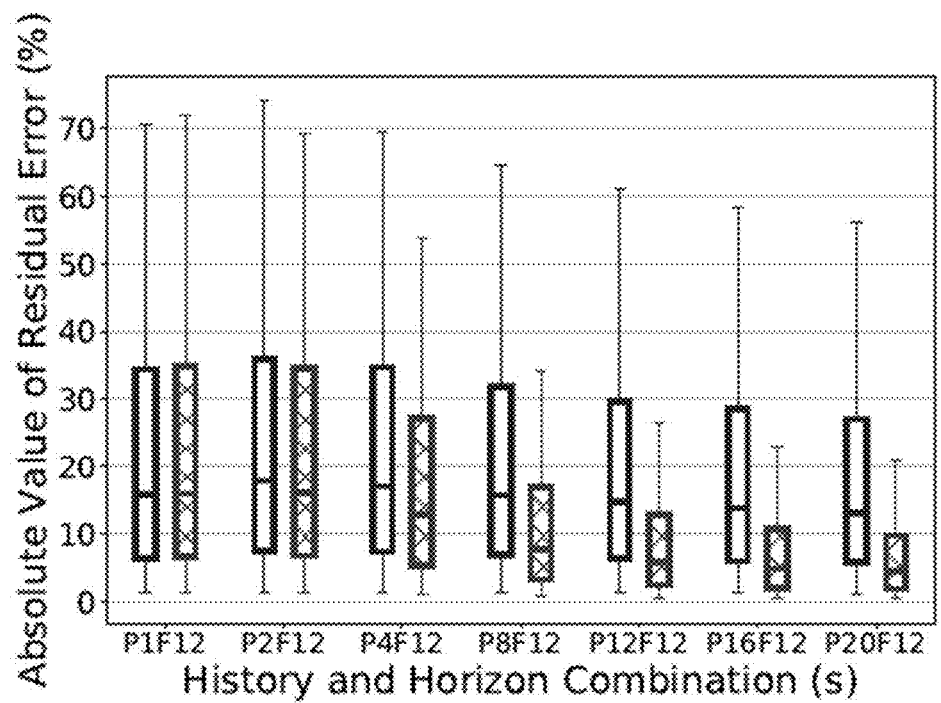
Figure 2F:
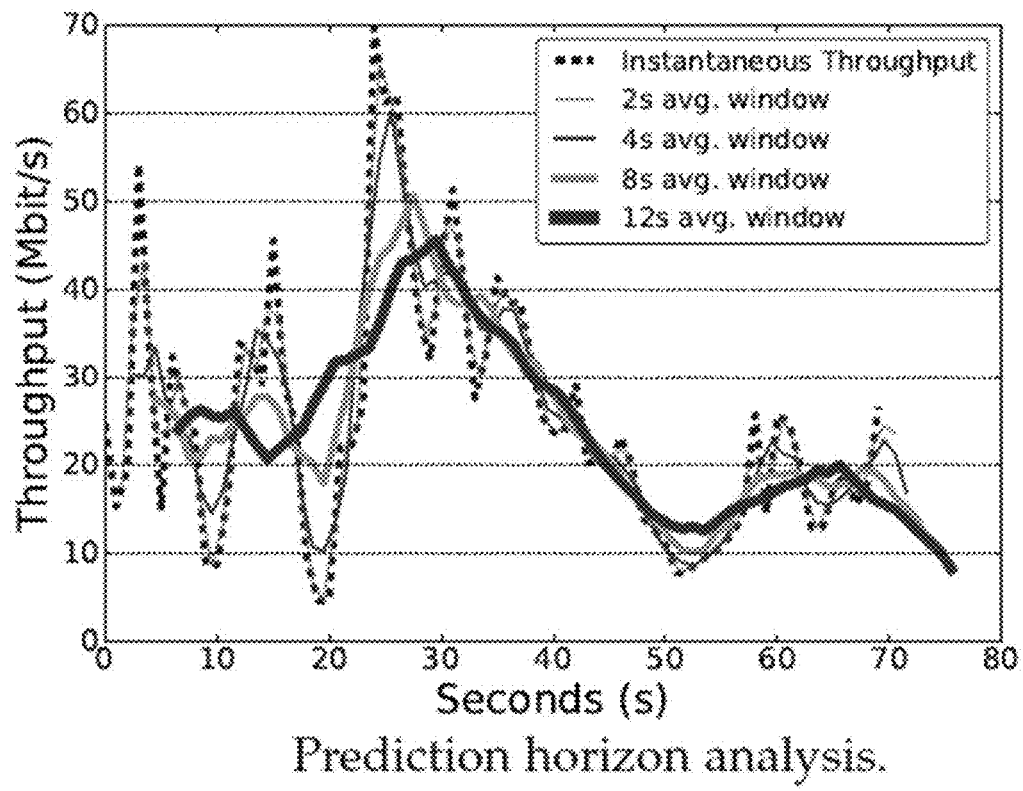
FIG. 2F is a graph showing averaged throughput predictions with different averaging windows, in accordance with embodiments of the disclosure.

To illustrate this behavior, FIG. 2F shows about one minute of actual throughput measured in the wild (blue dashed line) in comparison with average throughput calculated over different averaging windows. As the averaging window increases, the average throughput smoothes out, which (roughly) results in smaller variance compared to the instantaneous throughput. In the Appendix, we provide a mathematical formulation that serves to underpin this observation.

Figures 1, 2G:
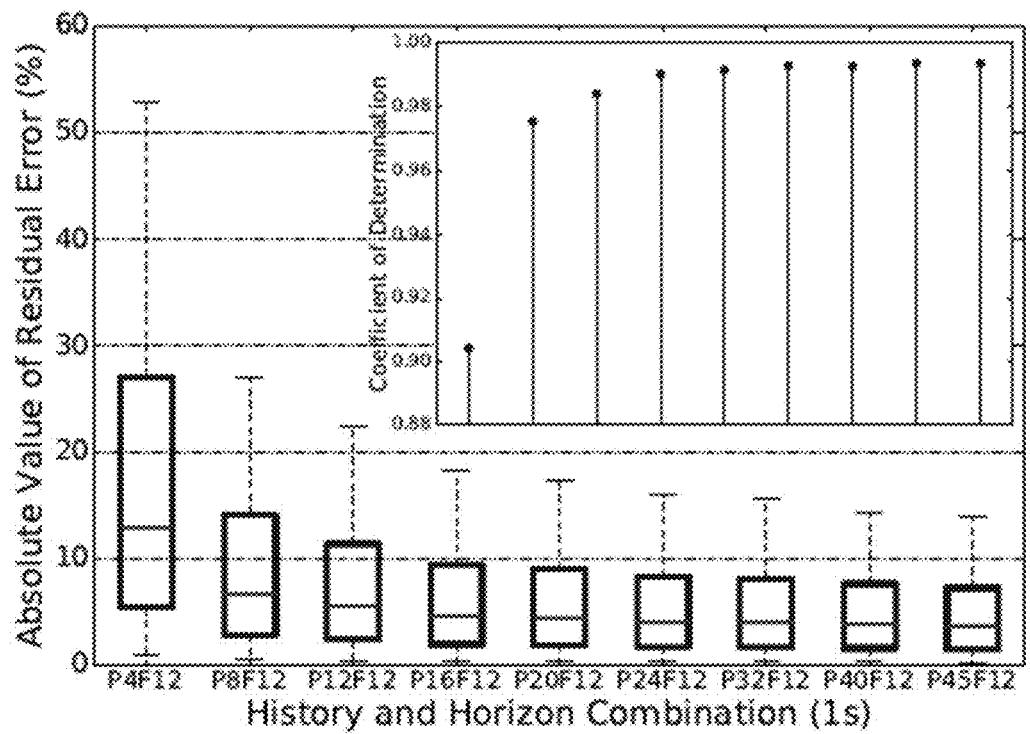
Figures 2, 2G:
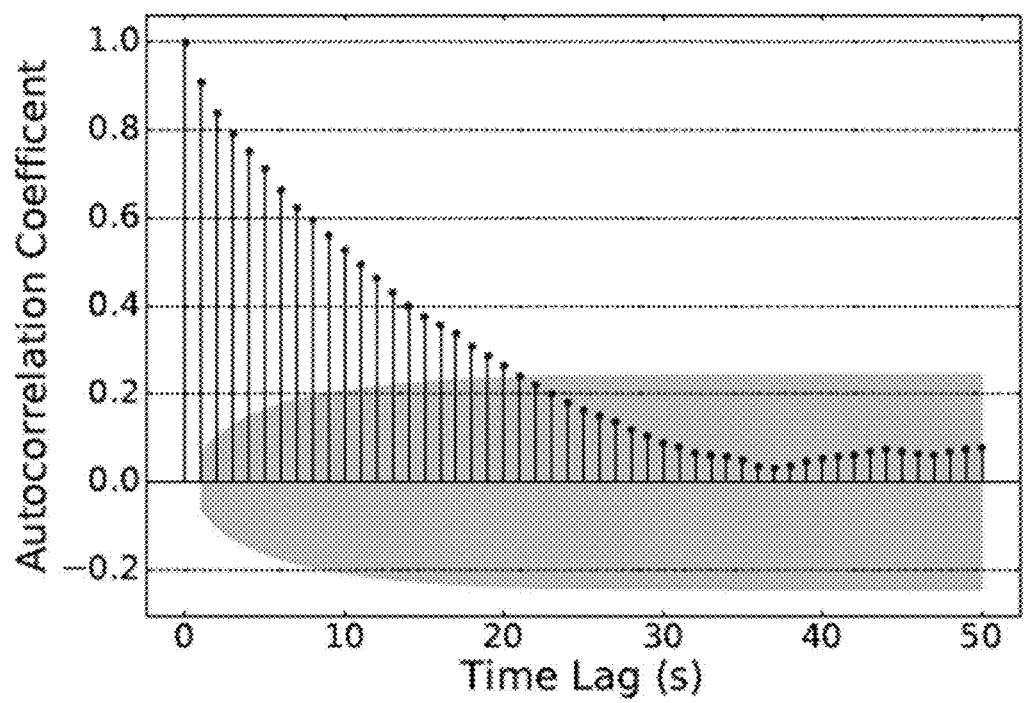
Figures 2, 2G, 3:
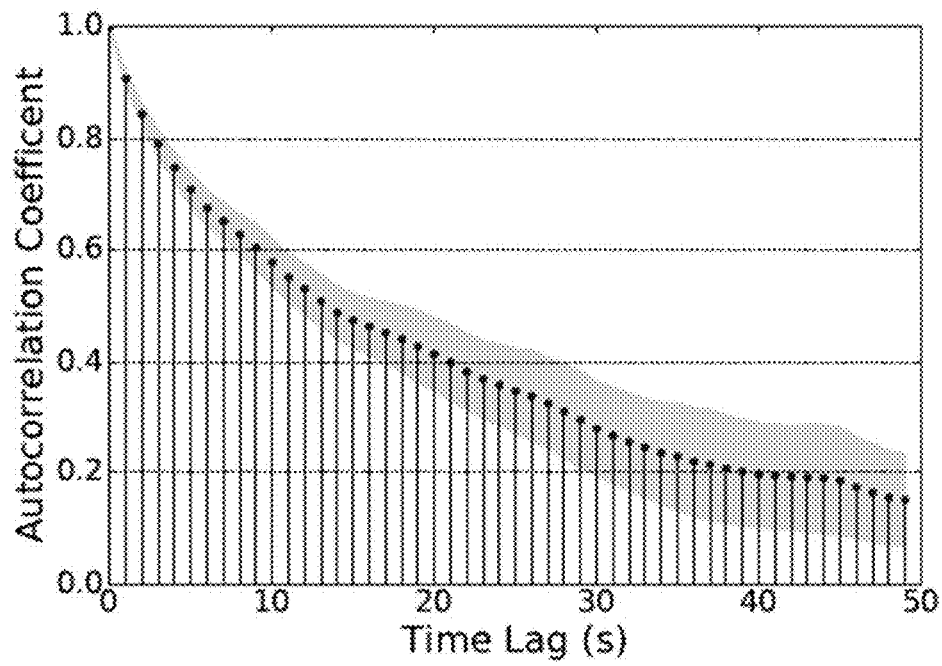

Similarly to increasing horizon, our above analysis also suggests a decrease of ARE with increasing history length. To confirm this, FIG. 2G-1 shows the ARE as a function of increasing history length. The figure shows that increasing history length is beneficial in term of ARE reduction up to a saturation point of 8 seconds, beyond which the ARE reduction is marginal. Further, no significant ARE reduction is observed past 20-second durations. Furthermore, similar observations hold for 4 and 8-second horizons. The same trend can also be seen for the CoD. Based on this result, in the following, we consider history length up to 20 seconds.

To further corroborate the latter observation, we introduce the autocorrelation coefficient (ACF), which measures the linear dependence between current and past values of a variable. The rationale of ACF is that low values (<0.4) indicate that past values of a KPI do not bring much benefit n predicting its current value, either because the past values are too old or because of the intrinsic randomness associated with the KPI. High ACF values (>0.8) suggest instead that incorporating such past values is beneficial in predicting the current and future values of the KPI.

FIG. 2G-2 shows the ACF for a randomly selected trace of the application throughput KPI. Time lag denotes how far in the past do we consider the value of the KPI, and we vary it between 0 and 50 seconds. The shaded area represents a 90% confidence interval. From the figure, it is clear that after the 20-second lag, the autocorrelation coefficient goes below confidence band indicating no significant correlation after a 20-second delay. However, for other traces, the coefficient can spread up to 40-seconds into the past before being indistinguishable to noise. To complete our analysis, we provide average ACF computed across all mobile traces collected, in FIG. 2G-3, where shaded area represents standard deviation band. Overall, the figure follows the trend observed in FIG. 2G-1, with high ACF values up to 20 seconds time lag. Finally, having a history window larger than 20-seconds has a negligible positive effect on overall ARE.

Figures 1, 2H:
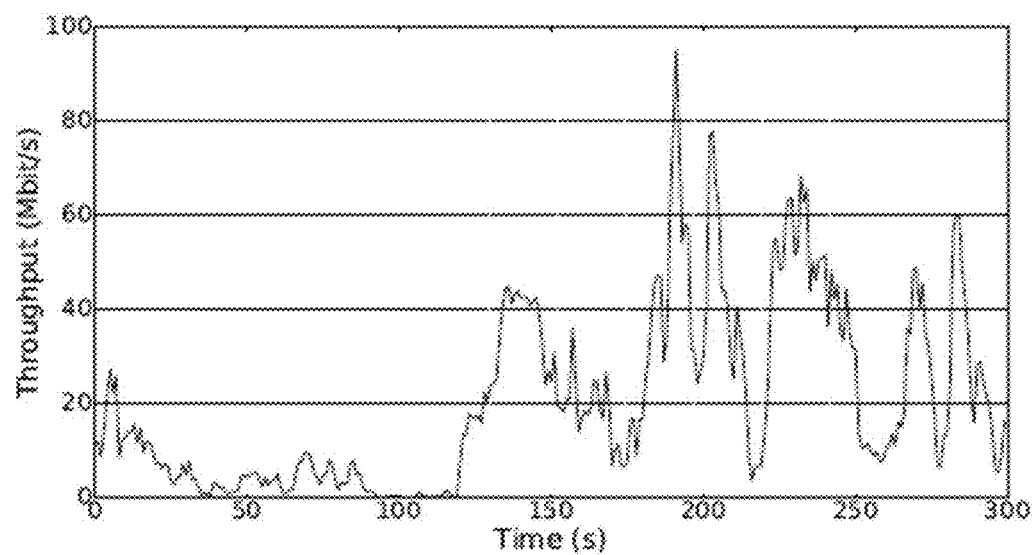
Figures 2, 2H:
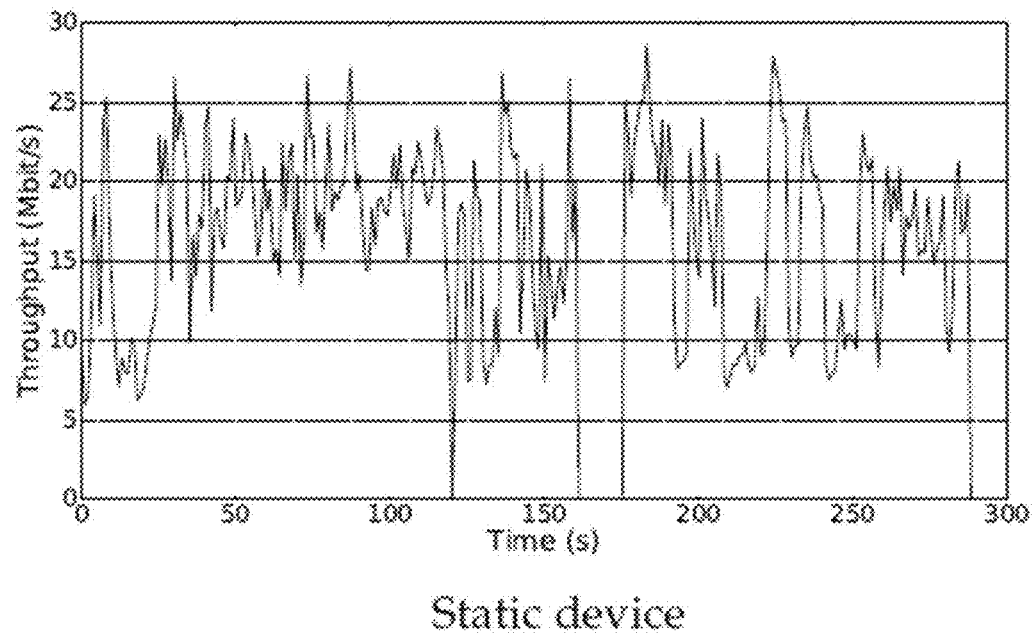

For static experiments, we measure an average throughput of about 10 Mbps with a standard deviation of 7.56 Mbps. For mobile experiments, we see an average throughput of 14.6 Mbps with a standard deviation of 12.64 Mbps. The lower average rate for static experiment stems from the fact that they were performed indoor. The larger standard deviation for the mobile case implies a throughput time series that is less "stable" around the mean. FIGS. 2H-1 and 2H-2 visually verify this observation by showing a sample time series of the measured throughput from two randomly chosen traces from the mobile and static experiments, respectively. The higher variability of the mobile scenario is due to environmental changes, e.g., channel and cell load. Intuitively, predicting a throughput with lower variation is an easier challenge; we further quantify this observation in the upcoming analysis.

Figure 2I:
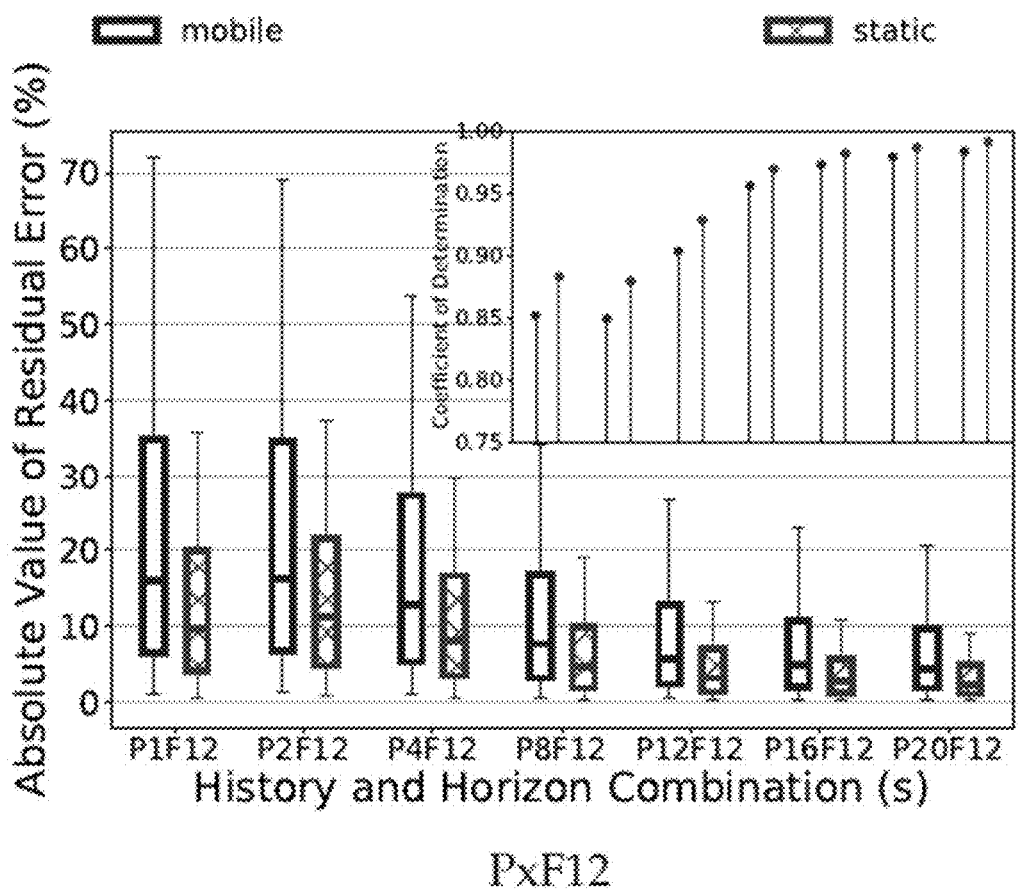
FIG. 2I is a graph showing absolute value of residual error (ARE) for throughput predictions with mobile and static devices, in accordance with embodiments of the disclosure.

FIG. 2I shows ARE values for static and mobile use-cases. We fix the prediction horizon to 12 seconds but vary the history duration. Overall, the figure shows a much better accuracy (lower ARE) in the static scenario. We compare the influence of history length on accuracy for static and mobile cases. With history length of 1 second, the majority of errors for the static case (90%) are less than 35%, while for the mobile case this doubles to 71%. However, extending history to 4 seconds (we use 4 seconds as a threshold to exploit the full benefits of the quantile approach), benefits mobile more than the static case, as the 90th percentile of ARE drops by 25%, while in static scenarios this drops is 16%. Increasing history follows the same trend, e.g., 90th of ARE decreases by 52% and 46%, for the mobile and static case, respectively. Nevertheless, the pattern changes for history length beyond 12 seconds, as relative error difference becomes more prominent for static than the mobile case (e.g., 20-second history lowers 90th percentile by 74% and 71% for static and mobile, respectively). We observed similar trends for other values of prediction horizon, e.g., for P20F8 the 90th of ARE for static and mobile cases is 12% and 25%, respectively. Similarly, for P20F4 the 90th of ARE for static and mobile cases is 20% and 37%, respectively. Because it is more challenging to predict throughput for mobile devices, in the rest of the paper we focus on mobile scenarios.

We investigate the importance of KPIs in throughput prediction. Instead of reporting individual KPI, we divide them into three groups and report the importance of each group. We start by focusing on device-based KPIs only, and divide KPIs into the following groups: throughput (which includes the history of both download and upload throughput values), radio (which includes the history of RSRP, RSRQ, SNR, etc.) and device velocity.

TABLE 2

Feature Importance for P1Fx cases.

| | P2F4 | P4F4 | F8F4 | P20F4 |
|---|---|---|---|---|
| Radio | 31% | 33% | 34% | 40% |
| Throughput | 64% | 62% | 61% | 55% |
| Velocity | 5% | 5% | 5% | 5% |

Table 2 shows how feature importance changes as we vary the history length. When we change history length from one to two, historical throughput values start contributing more significantly. E.g., for the P2F4 case, historical throughput contributes to 65% of future throughput prediction, and Radio KPIs and velocity contribute 30% and 5%, respectively. With even longer history, the quantile approach can finally be applied, and now we get a greater contribution from Radio KPIs. As the history increases from 2 to 20 seconds, radio KPIs importance increases to 40%, while throughput importance drops to 55%.

Table 3 shows feature importance for P1F4, P1F8, and P1F12 cases. Because of the 1-second sampling interval, a P1 case has only one sample, and thus the quantile approach is not possible.

TABLE 3

Feature Importance for P1Fx cases.

|  | P1F4 | P1T8 | P1F12 |
|---|---|---|---|
| Radio | 55% | 58% | 59% |
| Throughput | 38% | 34% | 35% |
| Velocity | 7% | 8% | 8% |

We see from Table 3 that Radio KPIs contribute 55-60% and Throughput KPIs contribute 35-40%.

Table 3 shows that if we fix a history length, then throughput importance goes down with longer horizons. For example, for P1, the importance of throughput goes down from 38% for F4 to 35% for F12. The drop is small, but we have observed similar trends for other values of history length as well. For example, in the P20Fx scenario, throughput importance drops from 55% to 49% to 46% for 4-second, 8-second, and 12-second horizon, respectively.

Figure 2J:
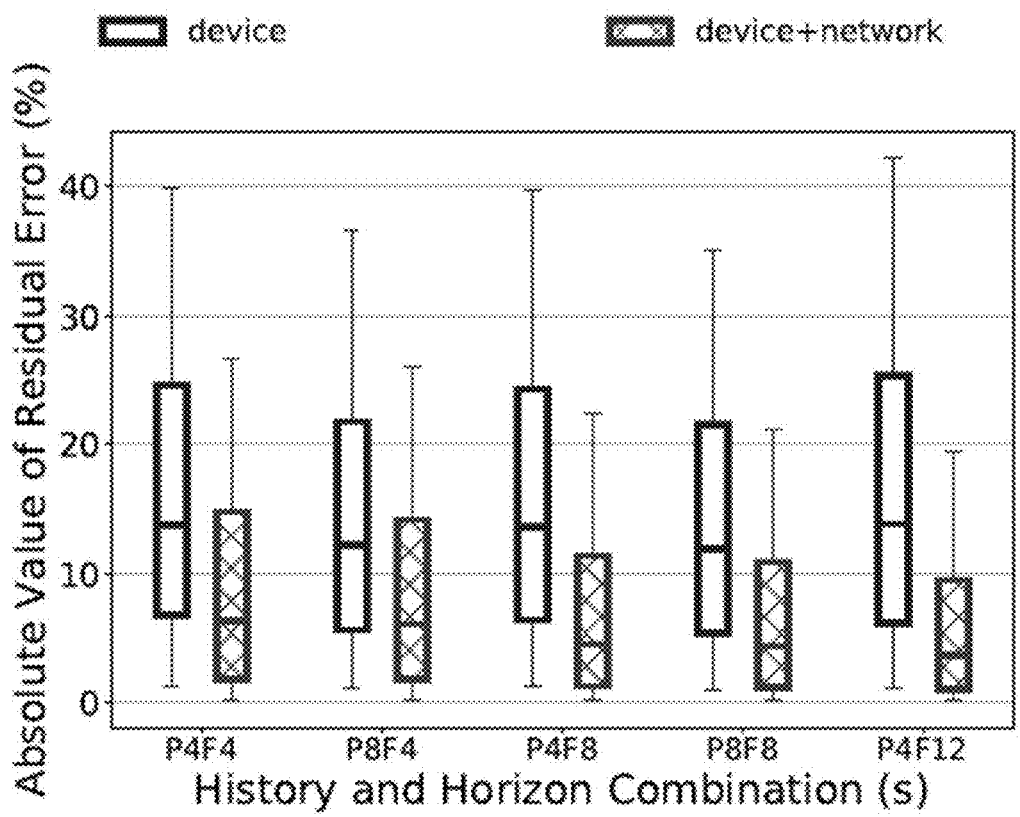
FIG. 2J is a graph showing the effect of considering network-based KPI data in addition to device-based KPI data, in accordance with embodiments of the disclosure.

Next, we investigate both ARE when introducing network-based KPIs (device and device+network in FIG. 2J) and considering selected history and horizon combinations, for mobile scenarios only. Overall, network-based KPIs provide a significant ARE reduction, across 4, 8, and 12 seconds. For example, for an 8-second horizon, network-based KPIs contribute to an ARE reduction (90th percentile) of 17.5% (P4) and 14% (P8). Furthermore, predicting average throughput for 12-second window results in 90th percentile ARE below 20%, with only 4-second history length. To achieve the same performance with device-based KPIs alone, we need to increase history length to 20 seconds. A similar conclusion holds for CoD. As the overall KPI history length increases, the ARE reduction provided by network-based KPIs reduces. This result is intuitive, as a device-based prediction can indirectly "infer" base station surroundings through information contained in the more extended history window. With a larger history window, the device-based prediction model can indirectly capture cell surroundings, including cell load and the number of devices from the change of the KPIs values. However, adding this information improves accuracy significantly.

We also analyze KPI importance in the presence of network-related KPIs. However, our analysis has one limitation. As already stated, we use constant 60-second history length for network collected KPIs due to a logging limitation at the network side. Analyzing the full effect of adding network information is thus restricted. For PyFx cases, network-related KPIs account for 10-11% of predicted throughput and do not change across different history and horizon combinations. This result is expected, as our history length for network-related KPIs is constant across different setups. Similarly, as we increase history length, device-based KPIs show a similar trend to the device-based case only, with throughput importance dropping as we increase history length, e.g., from 48% for P4F8 to 43% for the P8F8 scenario.

Figure 2K:
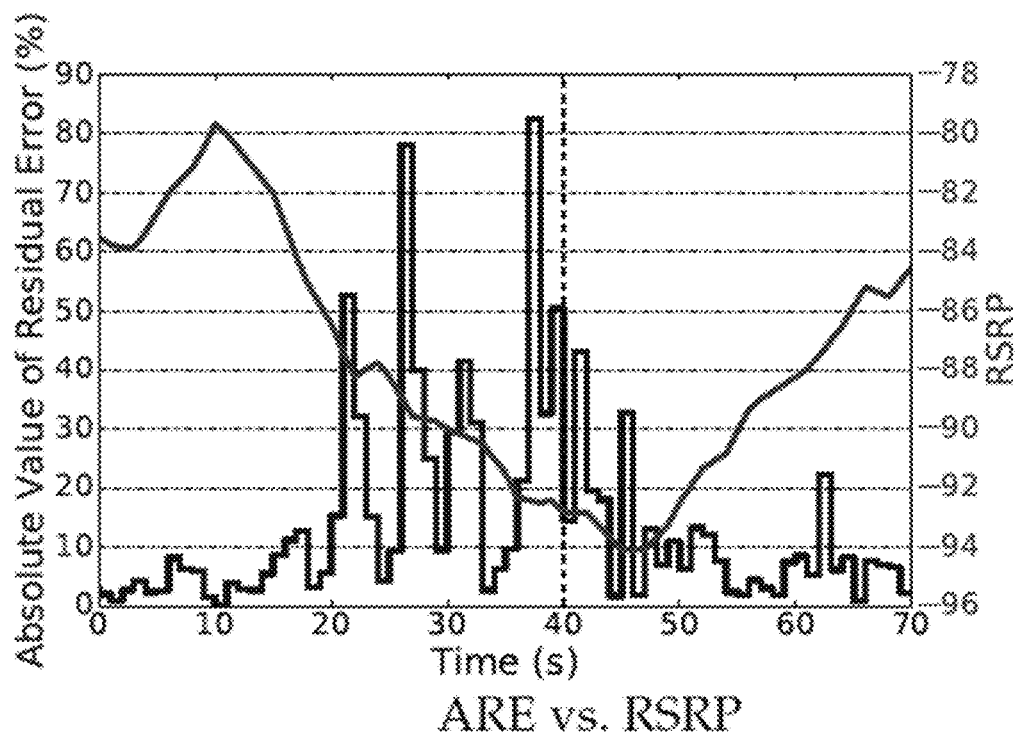
FIG. 2K is a graph showing ARE for throughput prediction and reference signal received power (RSRP) for a mobile device, in accordance with embodiments of the disclosure.

Many factors skew our prediction accuracy, including choice of ML algorithm, radio KPIs and random outliers coming from real measurements. In our evaluation, we use boxplot notation to counter occurrence of outliers. However, in the mobility scenario, there is an additional limiting factor that cannot be addressed with the current model. FIG. 2K shows ARE and RSRP values for a mobile device moving between two cells. We analyze the prediction case with the 12-second horizon. The black dotted line represents a handover event. We choose RSRP as it is a good indicator of edge conditions. The RSRP represents an average over future 12-seconds and thus matches the prediction horizon. It is clear that the error is relatively low except around the cell-edge region. As the device approaches the edge region, RSRP sharply drops while error increases significantly. There are two main reasons for this result. When predicting future values, the prediction model relies on past as the input. However at the time prediction is made, current channel metrics have relatively high values indicating good channel conditions. Nevertheless, as shown in the figure, RSRP drops suddenly due to device mobility.

Figure 2L:
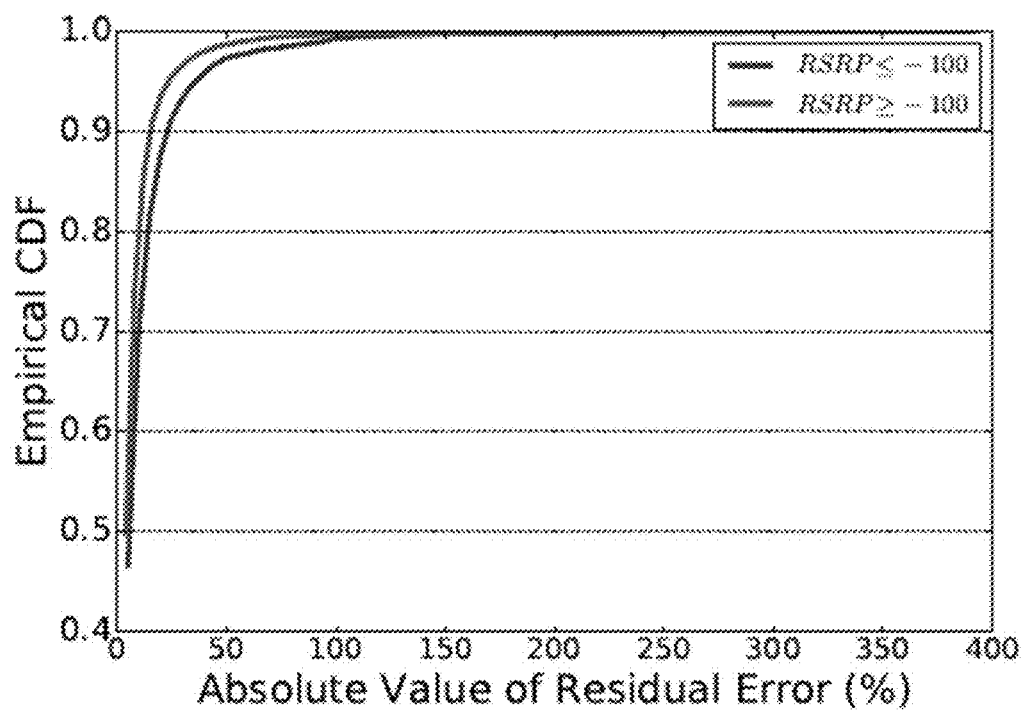
FIG. 2L is a graph showing cumulative distribution functions (CDFs) of ARE for throughput prediction for different RSRP ranges of a mobile device, in accordance with embodiments of the disclosure.

Next, for all traces, we split records based on calculated future RSRP into two categories: we group records with RSRP larger than −100 and vice versa. We choose this value to extract edge region around cells. Finally, we plot CDF of ARE for two cases, as depicted in FIG. 2L. For the records with RSRP smaller than −100, CDF is left of the case with larger RSRP, indicating overall higher errors.

One possible solution to counter higher errors in the cell-edge region is to use a shorter history. However, this approach would result in overall higher ARE. On the other hand, we could enhance the dataset by adding new features related to edge conditions. For example, we could add geographical distance between the current serving cell and all neighboring cells. Then the prediction model could identify devices approaching the edge region more accurately. Also adding signal-related information for neighboring cells could help in decreasing errors in the edge region of the cell.

Throughput Prediction Accuracy

Non-radio related aspects can influence throughput prediction. Besides the choice of ML algorithms, the throughput prediction can be influenced by different ways data can be arranged and grouped. In addition to device-based and network-based KPIs, the choice of where to execute the prediction model represents a trade-off between accuracy and scalability. Having the prediction model stored directly at the device is a scalable approach, but then network-related KPIs need to be sent back to the device if we wish to use them. On the other hand, placing the prediction at the base station results in having access to both KPI types, but raising questions of scalability. Finally, we investigate different types of transport protocol commonly used in practice and the impact on prediction error.

Figure 2M:
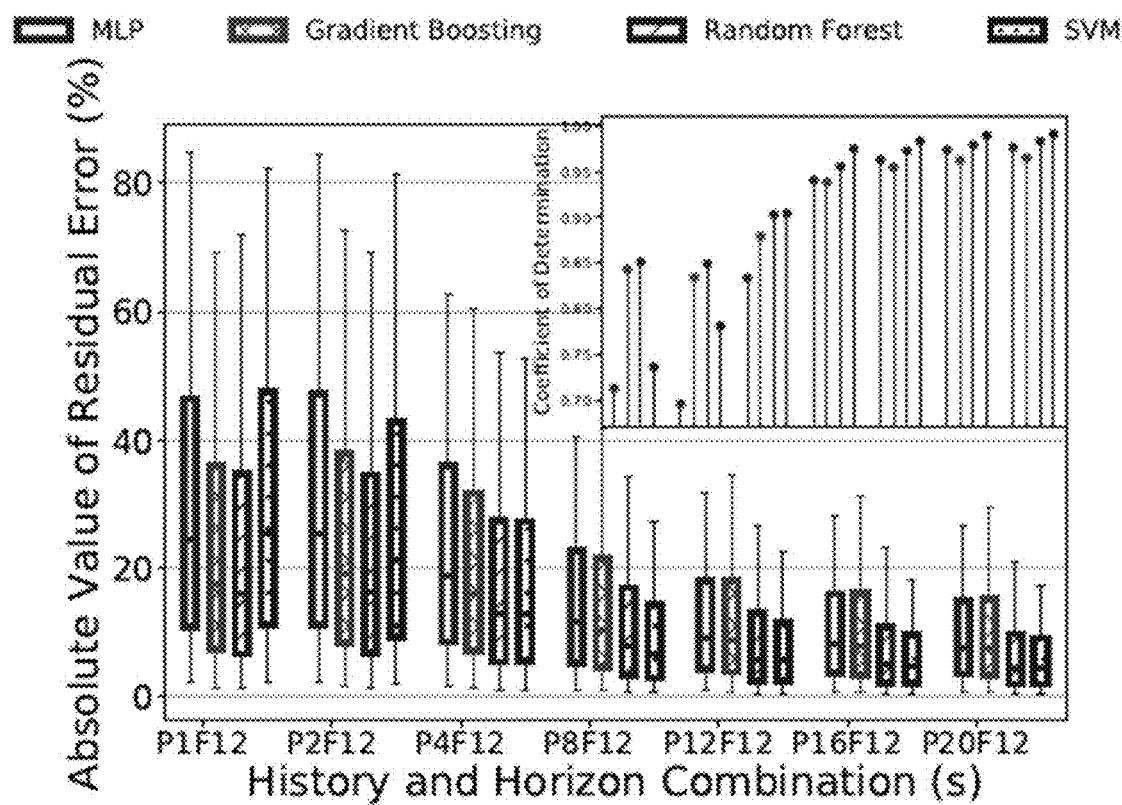
FIG. 2M is a graph showing a comparison of ARE for throughput predictions for different machine learning (ML) algorithms, in accordance with embodiments of the disclosure.

FIG. 2M shows ARE and CoD values for Random Forest (RF), Gradient Tree Boosting (GB), Multilayer Perceptron (MLP), and Support Vector Machine (SVM), when considering several history and horizon combinations.

Overall, the figure shows that no single algorithm outperforms all the others. For example, when P∈[1, 4], RF outperforms (lowest ARE) all other ML algorithms. For longer histories, SVM gives overall the lowest error across different horizons. For example, in the P20F12 scenario, 90% of the errors for SVM have an absolute value of less than 18% versus 21% for RF. Instead, GB and MLP have higher errors than RF and SVM achieving around 30% mark for 90% of errors for the P20F12 case. SVM and RF show similar performance across all history and horizon combinations.

To understand causes for different performance across ML algorithms, we use the standard approach by analyzing learning curves for each algorithm. The learning curve represents a ratio/difference between training and cross-validation error metric. The choice of error metric is arbitrary, as the more emphasis is on the difference obtained from training and CV data. For the following analysis, we choose CoD for the error metric. Next, we investigate both training and Cross-Validation (CV) error for MLP, RF, and SVM (GB and RF belong to the same family of ML algorithms; GB therefore is omitted).

Table 4 shows both training and CV error for the algorithms above as a function of the history length, i.e., amount of training data considered. Results of this analysis are discussed below for each algorithm.

TABLE 4

Learning Curves for different ML algorithms as a function of history interval and 12-second horizon

| Px= | 1 s | | | 2 s | | | 4 s | | | 8 s | |
|---|---|---|---|---|---|---|---|---|---|---|---|
| Alg. | MLP | RF | SVM | MLP | RF | SVM | MLP | RF | SVM | MLP | RF |
| Train sc. | 0.60 | 0.99 | 0.79 | 0.62 | 0.99 | 0.97 | 0.63 | 1.0 | 0.99 | 0.66 | 1.0 |
| CV sc. | 0.59 | 0.83 | 0.72 | 0.60 | 0.83 | 0.76 | 0.60 | 0.90 | 0.91 | 0.61 | 0.96 |

| Px= | 8 s | | 12 s | | | 16 s | | | 20 s | | |
|---|---|---|---|---|---|---|---|---|---|---|---|
| Alg. | SVM | MLP | RF | SVM | MLP | RF | SVM | MLP | RF | SVM | | |
| Train sc. | 0.99 | 0.68 | 1.0 | 0.99 | 0.69 | 1.0 | 0.99 | 0.70 | 1.00 | 0.99 | | |
| CV sc. | 0.97 | 0.63 | 0.97 | 0.98 | 0.63 | 0.98 | 0.99 | 0.64 | 0.98 | 0.99 | | |

SVM: For the smallest history window (P1), training and cross-validation errors have relatively low values with a narrow gap between them. This result indicates high bias (underfitting) producing a model with low prediction accuracy. Simply put, the model is not "complex" enough to capture patterns in real data. As the history length increases, the training score also increases and rapidly approximate 1 (maximum value). Conversely, the cross-validation score slowly increases and saturate at 8 seconds (P8). For P2 and P4, we have an indication of high variance (overfitting) which diminishes as the longer history helps in pattern realization.

RF: RF does not suffer from high bias for any history and horizon combinations. However, for history lengths shorter than eight seconds, the RF model relatively overfits on training data. This effect is countered as the history length increases.

MLP: The MLP model has a relatively low variance across different history and horizon combinations. Moreover, low values for both training and CV score result in high bias (underfitting). Alleviating bias requires better learning model.

Figure 2N:
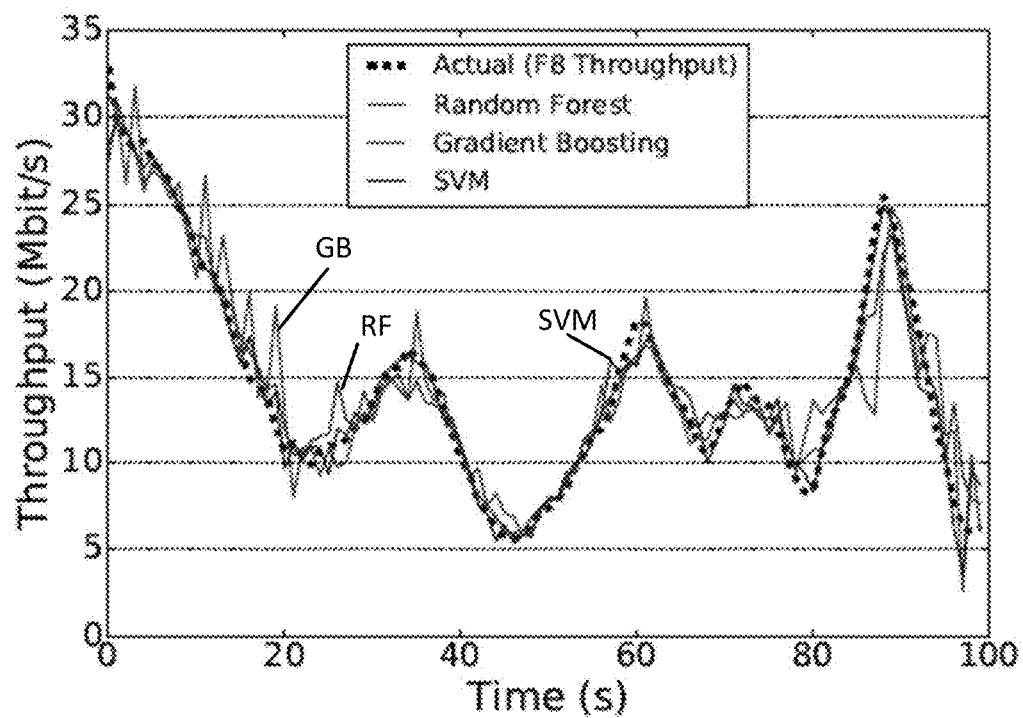
FIG. 2N is a graph showing a comparison of predicted throughput values for different machine learning (ML) algorithms, in accordance with embodiments of the disclosure.

FIG. 2N shows the actual throughput together with the predicted time series with SVM, RF, and GB predictors (from one randomly selected trace). We omit MLP as it has similar results as GB. The figure shows that a model based on SVM and RF closely follow the actual throughput having less variation than GB. Overall, SVM and RF show similar performance and choice for algorithm depends on the selected scenario.

The analysis so far was based on per device training and prediction. Simply put, we compute one model per device based on its device-based KPIs and the shared network-based KPI. Intuitively, this approach provides high accuracy but also has high computational cost. This is fine if the model can be deployed directly within the mobile devices. If this is not the case and, for example, the model should be deployed within a cell we then face a scalability problem. Further, when a device moves to a different cell, we face the challenge of copying this model to the processing unit of the new cell.

Two alternative approaches (per cell and per region) were investigated with the rationale to trade higher prediction error in favor of lower computational cost. The "per cell" solution implies that a single model is trained based on all the devices connected within a given cell and then applied to all future devices located in the cell. The "per region" solution further coalesces neighbor cells into a single region for which it derives and applies a single model.

Figure 2O:
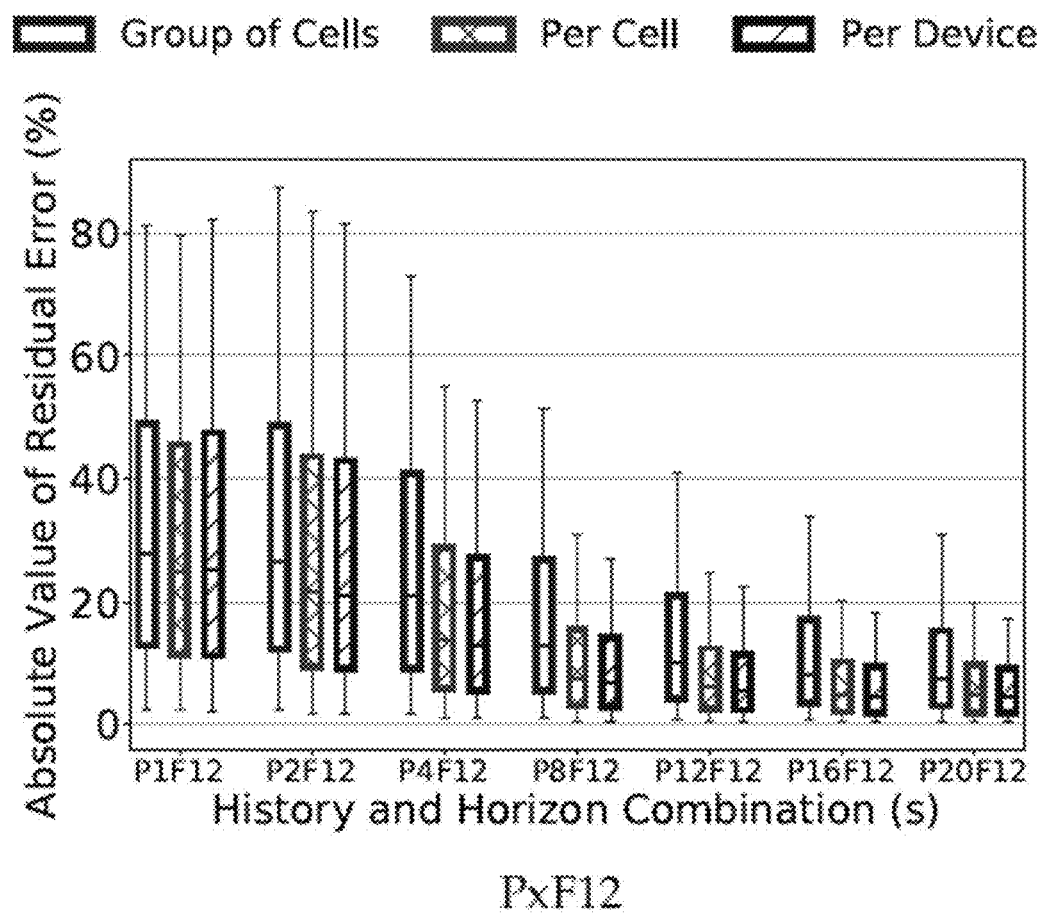
FIG. 2O is a graph showing a comparison of ARE for throughput predictions for mobile devices grouped into cells and regions, in accordance with embodiments of the disclosure.

FIG. 2O compares ARE for the different approaches to model creation and usage discussed above. As expected, the per device approach gives overall lowest prediction error, followed by per cell (extra 1-2% error, on average) and finally per region approaches (extra 15% error, on average). The trend is similar across all three different horizons (4 s, 8 s, 12 s).

Table 5 further analyzes the training and CV scores for the three approaches above.

TABLE 5

Learning Curves for different data grouping as a function of history interval and 12-second horizon

| Px= | 1 s | | | 2 s | | | 4 s | | | 8 s | |
|---|---|---|---|---|---|---|---|---|---|---|---|
| Alg. | GC | Cell | Device | GC | Cell | Device | GC | Cell | Device | GC | Cell |
| Train sc. | 0.74 | 0.78 | 0.79 | 0.87 | 0.96 | 0.97 | 0.93 | 0.99 | 0.99 | 0.97 | 0.99 |
| CV sc. | 0.72 | 0.74 | 0.71 | 0.75 | 0.79 | 0.76 | 0.83 | 0.90 | 0.91 | 0.92 | 0.97 |

| | Px= | 8 s | 12 s | | | 16 s | | | 20 s | | |
|---|---|---|---|---|---|---|---|---|---|---|---|
| | Alg. | Device | GC | Cell | Device | GC | Cell | Device | GC | Cell | Device |
| | Train sc. | 0.99 | 0.99 | 0.99 | 0.99 | 0.99 | 0.99 | 0.99 | 0.99 | 0.99 | 0.99 |
| | CV sc. | 0.98 | 0.05 | 0.98 | 0.98 | 0.97 | 0.99 | 0.99 | 0.98 | 0.99 | 0.99 |

For short history (one second), all three approaches experience high bias; this is again due to simplistic models that cannot capture patterns in the data. As we increase the history length, cell and device solutions close the gap between the training and cross-validation scores, indicating low bias and variance of their models. The per region approach, on the other hand, keeps the gap between training and cross-validation score relatively high, resulting in overfitting.

Overall, the difference in accuracy between a per device and per cell approach is minimal. The per cell approach may have an advantage of reduced computational cost.

Device-based and network-based KPIs used so far are associated with active experiments involving the download of a large file (100 MB, see Section 4.1). Here, we also consider more challenging and realistic conditions involving two TCP connections (2×TCP) and a small 1 MB file, which is common in live streaming applications for instance. As expected, 2×TCP gives overall higher bandwidth utilization as depicted in Table 6. We build a common prediction model using the 1×TCP large file case to accurate estimate available bandwidth.

TABLE 6

Mean and standard deviation for mobile cases

| Type | Mean (Mbit/s) | SD (Mbit/s) |
|---|---|---|
| 1xTCP-C-SF | 11.46 | 10.48 |
| 1xTCF-C | 14.58 | 12.64 |
| 2xTCP-C | 17.17 | 18.82 |

Figure 2P:
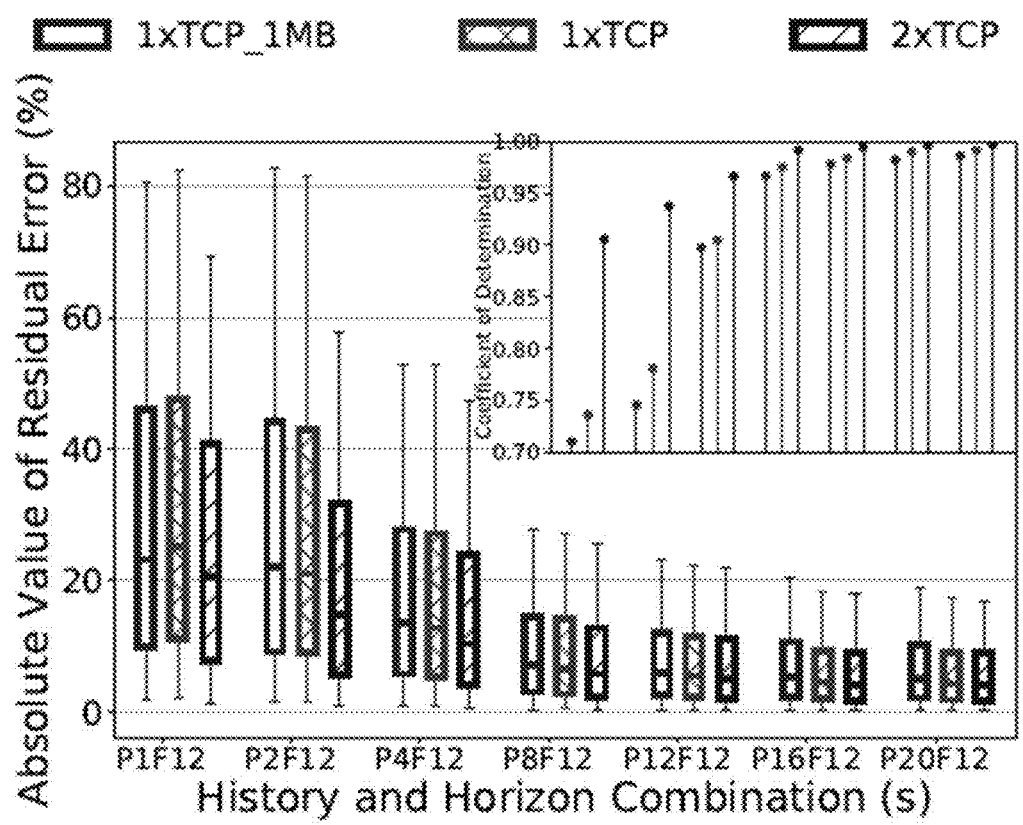
FIG. 2P is a graph showing a comparison of ARE for throughput predictions for different transmission control protocol (TCP) connections used in a streaming application, in accordance with embodiments of the disclosure.

FIG. 2P compares the different TCP setups and file sizes in term of ARE.

Overall, the 2×TCP case achieves lower ARE, and no noticeable difference is observed for 1×TCP when downloading either a small or a large file. It is worth noting that for P1Fx and P2Fx, the 2×TCP case shows significantly lower ARE than 1×TCP (both small and large). The reason for this behavior lies in a strong correlation between features and throughput. For example, CQI may be taken to represent an upper bound on achievable throughput. Usually, a device experiences a lower throughput than this upper bound because of TCP and interaction with the wireless environment, scheduling algorithm at the cell, etc. With 2×TCP these effects are alleviated (excluding scheduling), and the device gets closer to ideal throughput, thus increasing the correlation between CQI and throughput (0.6 and 0.5 for 2×TCP and 1×TCP case respectively). This higher correlation contributed in lowering the prediction error with short KPIs history.

Figure 2Q:
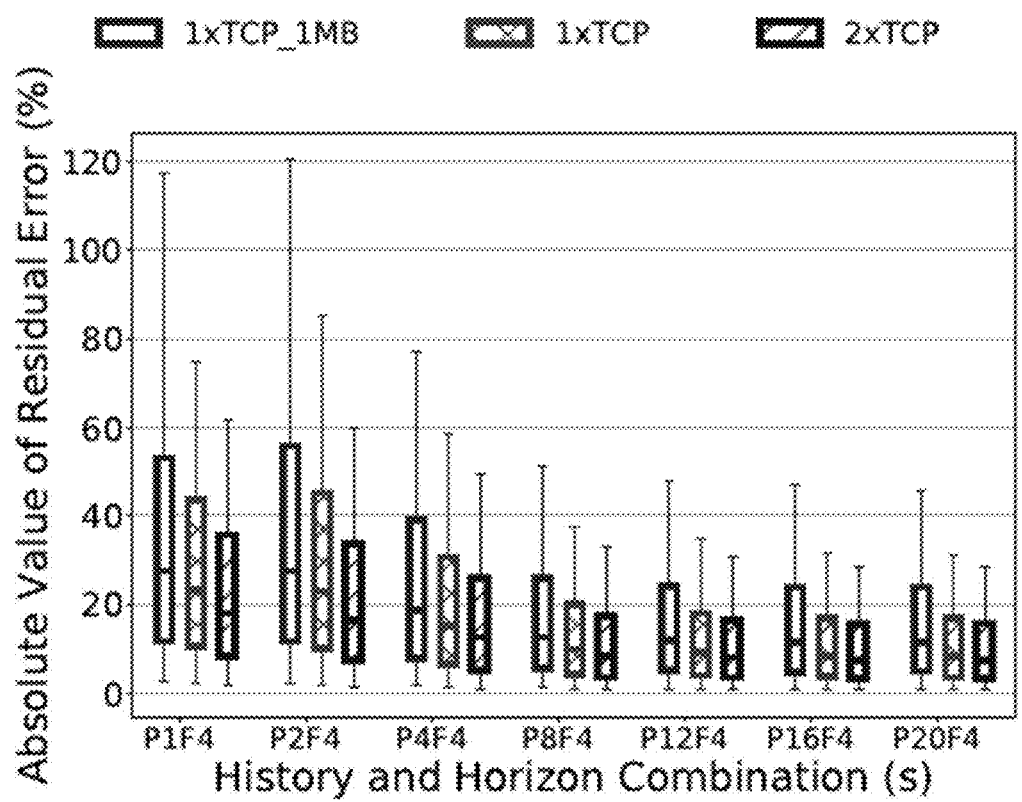
FIG. 2Q is a graph showing a comparison of ARE for throughput predictions for different transmission control protocol (TCP) connections and different KPI data history time periods, in accordance with embodiments of the disclosure.

We repeat the analysis above for variable prediction horizon (between 1 and 12 seconds). In this case, using a small file increases the prediction error significantly for small horizons, as depicted in FIG. 2Q. As we increase the prediction horizon, the difference between errors diminishes. With small file size, we have OFF periods which last 1-3 seconds. These periods have zero throughput value, although the application is not idle. This phase results in adding noise to our ML model, as channel and environment conditions don't reflect downloaded throughput. For larger horizon, these zero values get smoothed.

Higher KPI Granularity

Figure 2R:
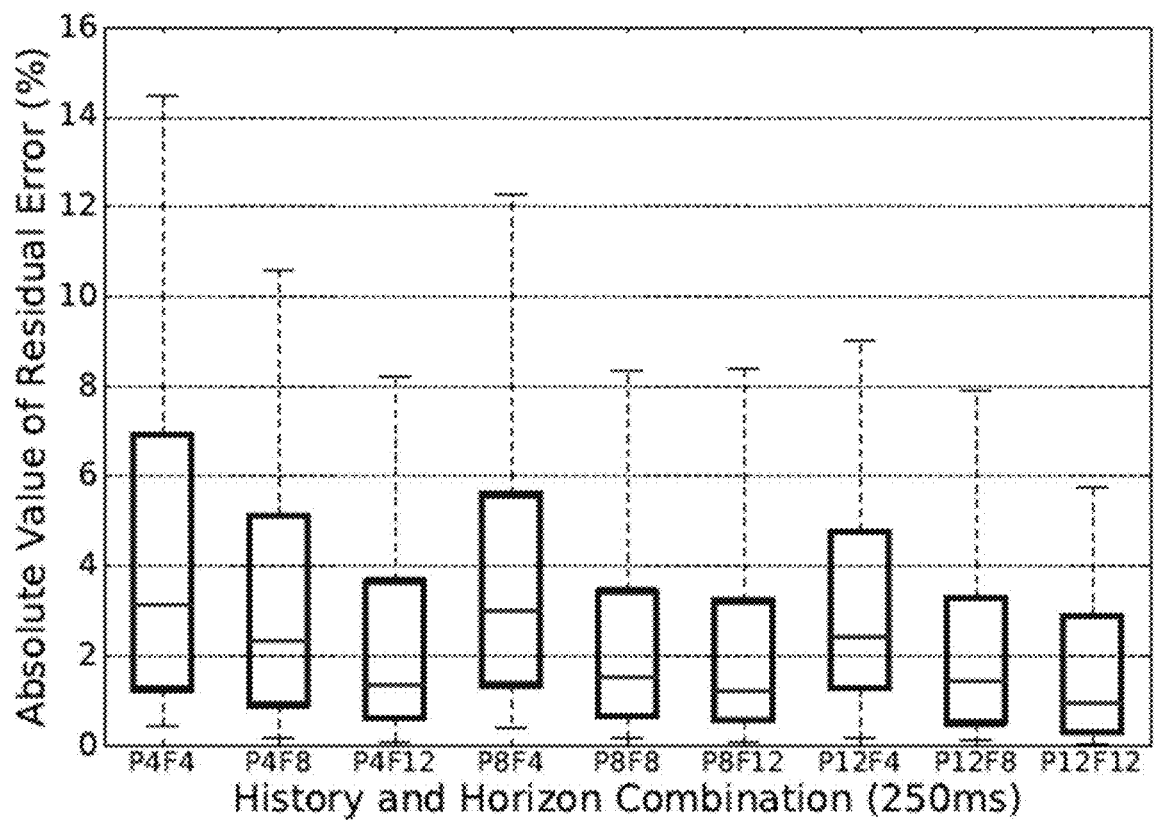
FIG. 2R is a graph showing a comparison of ARE for throughput predictions for different values of KPI granularity, in accordance with embodiments of the disclosure.

For 250 ms KPI granularity, higher sampling frequency results in better overall prediction accuracy. FIG. 2R depicts ARE for different combinations of history and horizon values. Regardless of the horizon, higher KPIs granularity results in massive improvement for ARE (compared to one-second granularity), with the 90th percentile of ARE below 15% for all cases. Furthermore, average error 7%, 5.5%, and 5% for prediction horizons 4, 8, and 12 seconds respectively (with only four-second history interval). Also, a similar trend is observed as with one-second granularity, with prediction accuracy improving as we increase history and horizon lengths. 5% for prediction horizons 4, 8, and 12 seconds respectively (with only four-second history interval).

According to aspects of the disclosure, throughput prediction for a cellular network is based on analysis of cellular KPIs sourced from both user device and network equipment. In particular, wireless channel KPIs may be used with a machine learning methodology for forecasting throughput. These KPIs may be highly stochastic in practice; accordingly, a statistical summary of each KPI may advantageously be used as the basis for prediction, rather than raw captured KPI values. This in turn results in lower prediction errors. Furthermore, from the tuning process of RF, a significant improvement may be obtained by not using all features per tree. A new algorithm thus could be designed specifically for cellular throughput prediction where a grouping of different, statistically uncorrelated KPIs is done a priori, facilitating the learning process for the algorithm itself and resulting in faster and possibly more accurate predictions.

In an embodiment, device-based KPIs are sourced on the end-user device, and a prediction engine is resident on the device itself, with network KPI values provided to each device. In another embodiment, a network-based prediction engine resides on a server communicating with multiple devices over the network.

In a particular embodiment, machine learning techniques with radio channel KPIs summarized by a quantile summarization technique may be used to achieve low throughput prediction errors (90% of errors below 18%).

Traces are described herein as sample realizations from an infinite population of time series generated by the stochastic process.

Let $x_i$ be measured samples of instantaneous throughput. Define new samples of process $F^k$ as:

$$f_i^k = \frac{1}{k}\sum_{j=1}^{k} x_{i+j} \text{ for } i \in [1, N-k] \tag{2}$$

where N is number of samples in trace, and k is averaging window size. Average value of transformed trace is:

$$\mathbb{E}(F^k) = \frac{1}{N-k}\sum_{i=1}^{N-k} f_i^k \tag{3}$$

Average value would depend on properties of measured time series. Using Augmented Dickey-Fuller test, the majority of the traces have properties of stationary stochastic process. This property results in values oscillating about a constant mean across all time points.

Using this feature, (2) results in:

$$f_i^k = \frac{1}{k}\sum_{j=1}^{k} x_{i+j} \approx \mu \text{ where } \mu = \frac{1}{N} \times \sum_{i=1}^{N} x_i. \text{ Using (4) in (3):} \tag{4}$$

$$\mathbb{E}(F^k) \approx \mu \tag{5}$$

Figure 2S:
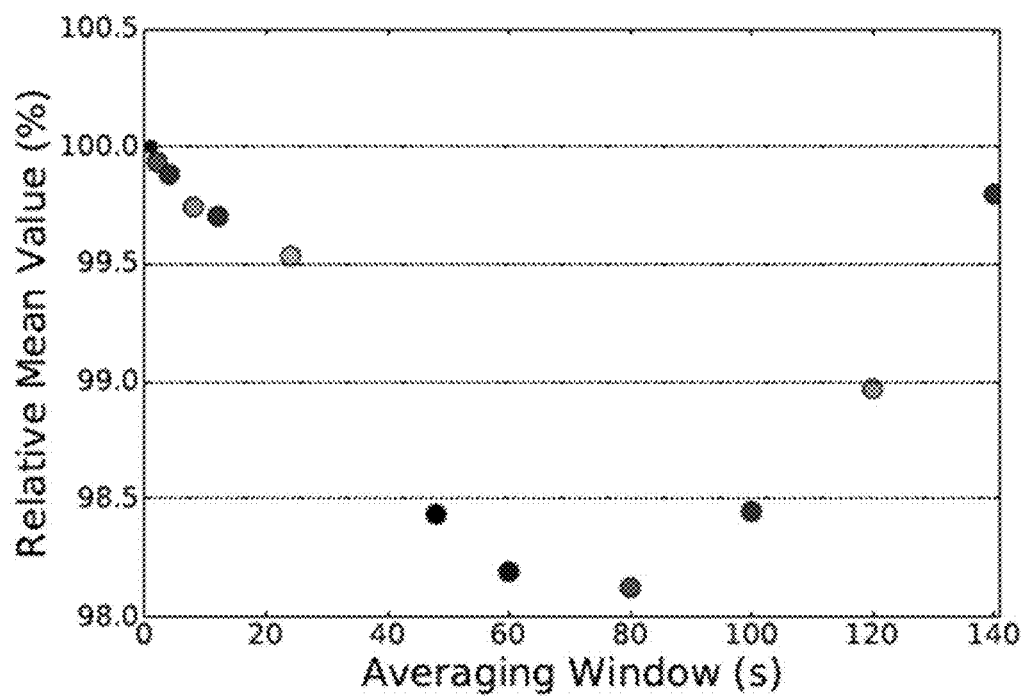
FIG. 2S is a graph showing average throughput traces for different averaging windows, in accordance with embodiments of the disclosure.

FIG. 2S depicts relative average value for different averaging windows as a ratio between average instantaneous throughput and average throughput for a given interval. Average value fluctuates around reference value depending on window size. Maximum difference is less than 2%, and for our cases of interest (2 s, 4 s, 8 s, 12 s) average values differ by 0.5%. Therefore (5) holds, and the mean value does not significantly change with window size.

Define variance of process $F^k$:

$$\text{Var}(F^k) = \frac{1}{N-k}\sum_{i=1}^{N-k}(f_i^k - \mu)^2 \tag{6}$$

For each sample $f_i^k$ we have:

$$(f_i^k - \mu)^2 = \frac{1}{k^2}\left[\sum_{j=0}^{k-1}(x_{i+j+1} - \mu)^2 + 2\sum_{j=0}^{k-2}\sum_{z=j+1}^{k-1}(x_{i+j+1} - \mu)(x_{i+z+1} - \mu)\right] \tag{7}$$

The double summation term in (8) represents an auto-covariance. For uncorrelated data, this term equals to zero. Assuming that the data is uncorrelated, (7) becomes:

$$(f_i^k - \mu)^2 = \frac{1}{k^2}\sum_{j=0}^{k-1}(x_{i+j+1} - \mu)^2 \tag{9}$$

Combining (9) and (6) we have:

$$\text{Var}(F^k) = \frac{1}{N-k}\frac{1}{k^2}\sum_{i=1}^{N-k}\sum_{j=0}^{k-1}(x_{i+j+1} - \mu)^2 \text{ Using} \tag{10}$$

$$\sum_{i=1}^{N-k}\sum_{j=0}^{k-1}(x_{i+j+1} - \mu)^2 \leq k\sum_{i=1}^{N}(x_i - \mu)^2 \text{ in (10):}$$

$$\text{Var}(F^k) \leq \frac{N}{N-k}\frac{1}{k}\text{Var}(X) \tag{11}$$

For large N, variance of the transformed process decreases as we increase averaging window size.

However, our data is correlated, as depicted in FIG. 2G-2. Next, (11) becomes:

$$\text{Var}(F^k) \leq \tag{12}$$

$$\frac{N}{N-k}\frac{1}{k}\text{Var}(X) + 2\frac{1}{N-k}\frac{1}{k^2}\sum_{i=1}^{N-k}\sum_{j=0}^{k-2}\sum_{z=j+1}^{k-1}(x_{i+j+1} - \mu)(x_{i+z+1} - \mu).$$

The total variance of process $F^k$ now also depends on the value of auto-covariance. However, covariance will be reduced by the $k^2$ factor. We expect that in majority of cases the resulting variance will be lower than Var(X).

Figure 2T:
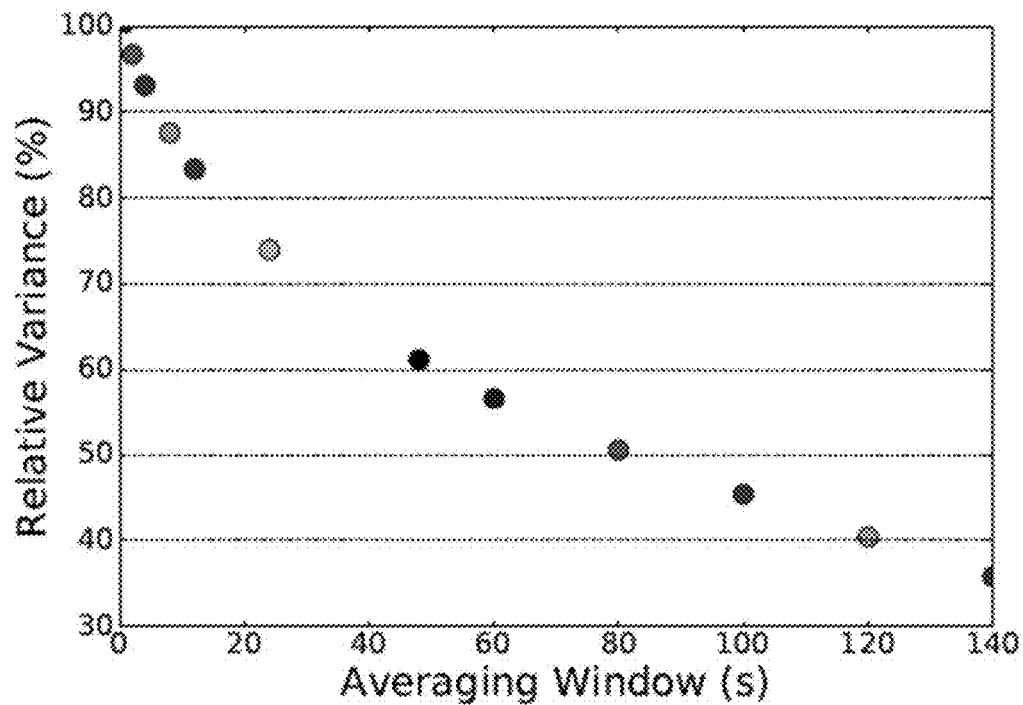
FIG. 2T is a graph showing relative variance of throughput values for different averaging windows, in accordance with embodiments of the disclosure.

FIG. 2T illustrates relative variance for different averaging window sizes. Relative variance is defined as the ratio between variance for "original" time-series and variance of transformed time-series with averaging interval k. Variance drops as we increase k which is expected. Variance drops by 3.5%, 7%, 12%, and 16.5% for 2 s, 4 s, 8 s, and 12 s respectively. We can conclude that variance significantly decreases as we increase averaging window size.

Additional ML Algorithms

In further embodiments, a hierarchical RF algorithm (H_RF) or a Deep Learning Algorithm may be used for predicting network throughput. In the case of H_RF, according to a particular embodiment, the RF algorithm is modified to select certain decision trees (instead of random), and a second stage is introduced where the decision tree outputs are combined as input to a new ML algorithm.

Figure 2U:
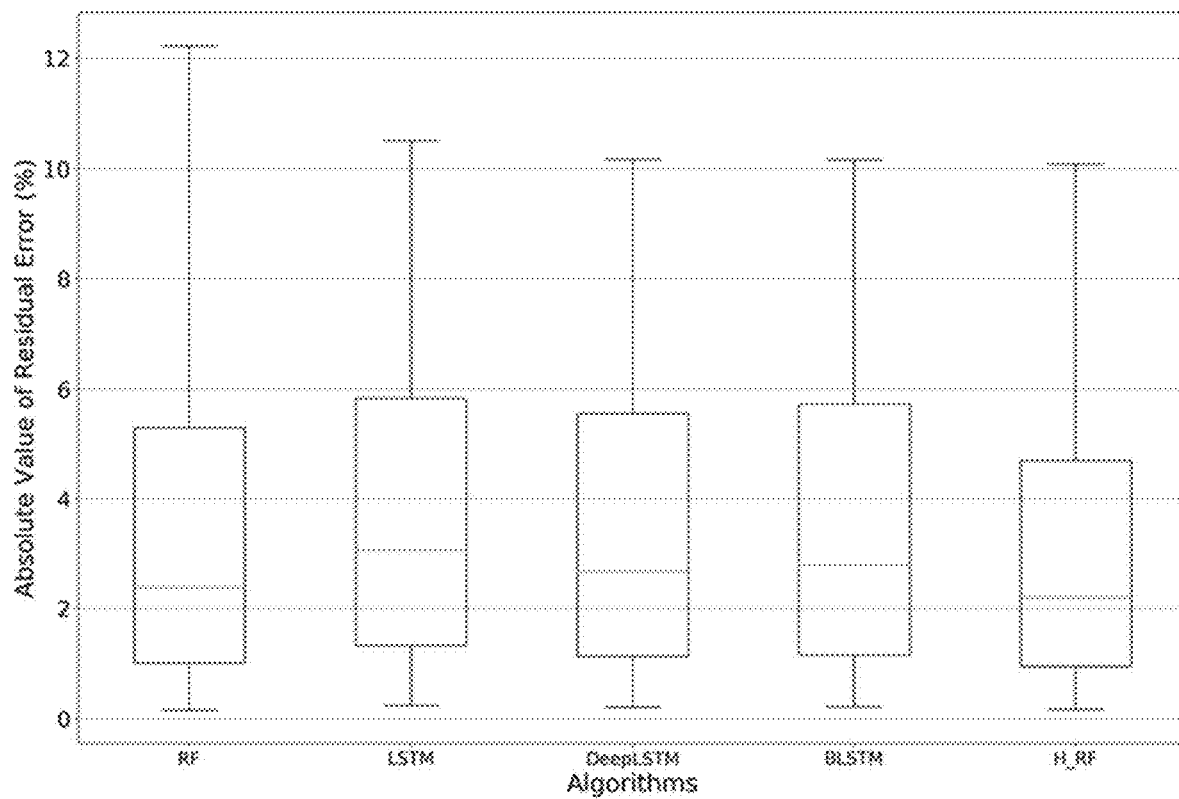
FIG. 2U is a graph showing a comparison of ARE for throughput predictions using random forest, hierarchical random forest, and deep learning algorithms.
Figure 3:
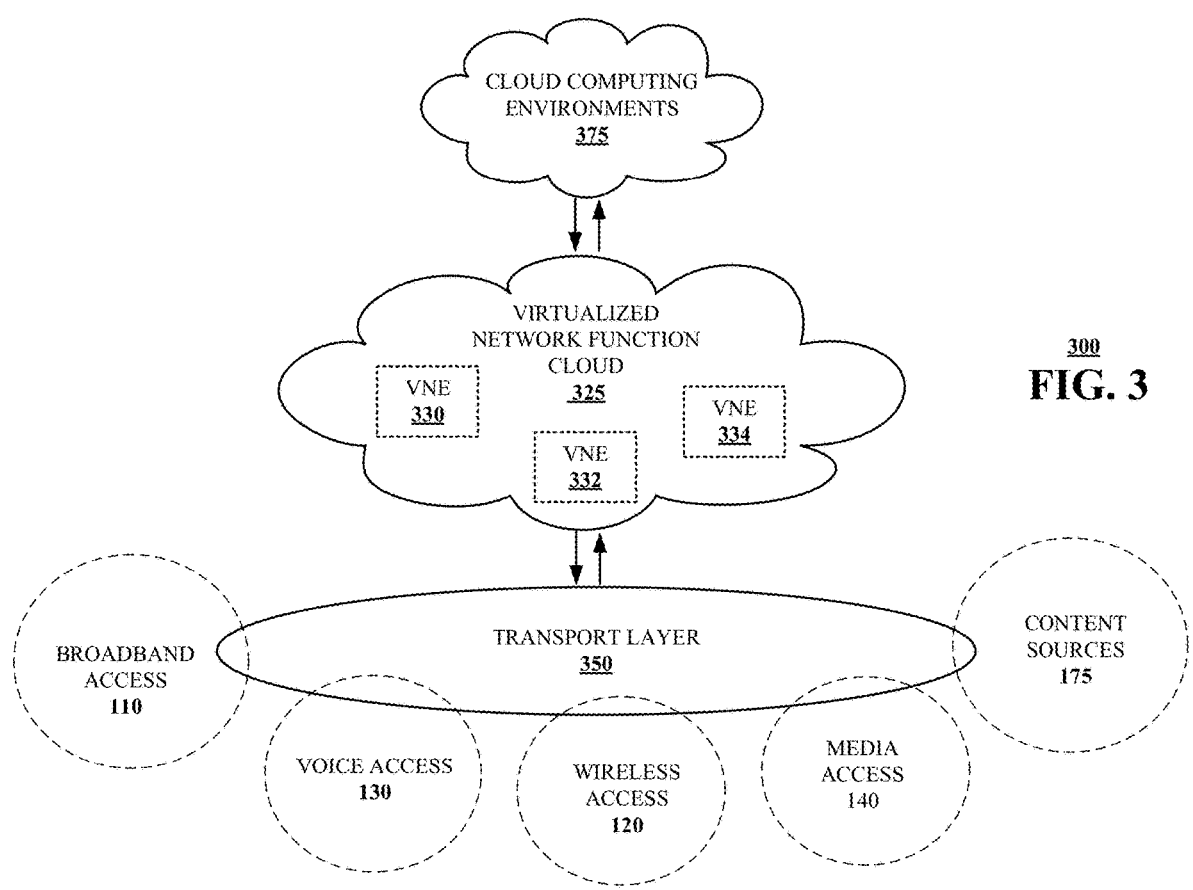

FIG. 2U is a graph showing a comparison of ARE for throughput predictions using RF, H_RF, and three Deep Learning algorithms: LSTM, DeepLS™ and BLS™. These three algorithms represent Long Short-Term Memory units of the recurrent neural network (RNN) family of deep learning algorithms. The throughput predictions of FIG. 2U were generated using a 20-second prediction horizon and a 20-second history interval. As shown in FIG. 2U, an improvement in throughput prediction can be obtained relative to RF, particularly by using H_RF.

In additional embodiments, throughput predictions can be generated using Deep Learning algorithms with a raw stream of KPI performance data as input, rather than the statistical summarization of the data described above. In a particular embodiment, an algorithm (e.g. LSTM) can take the place of a processing system that generates a statistical summarization of the data.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
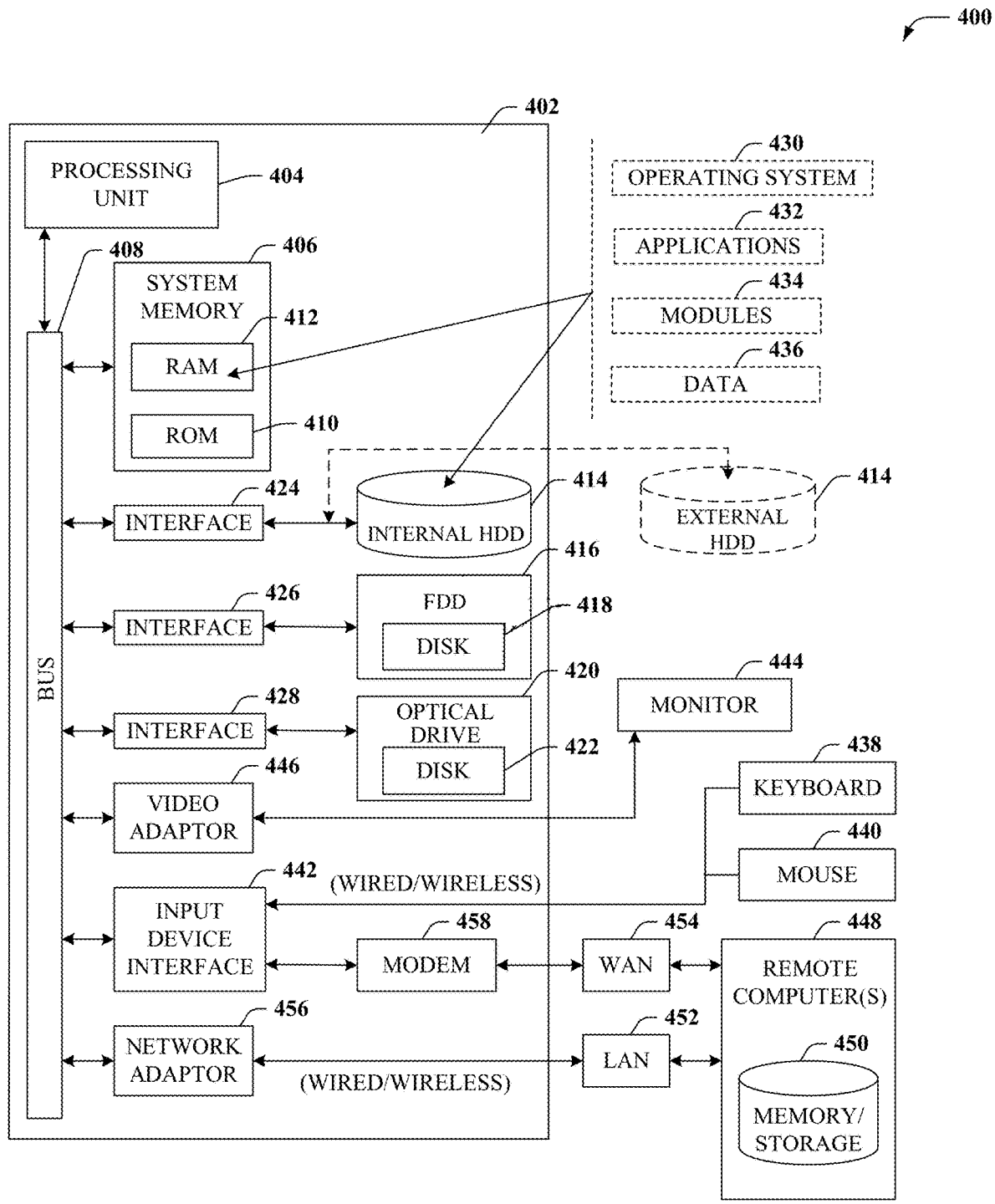
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
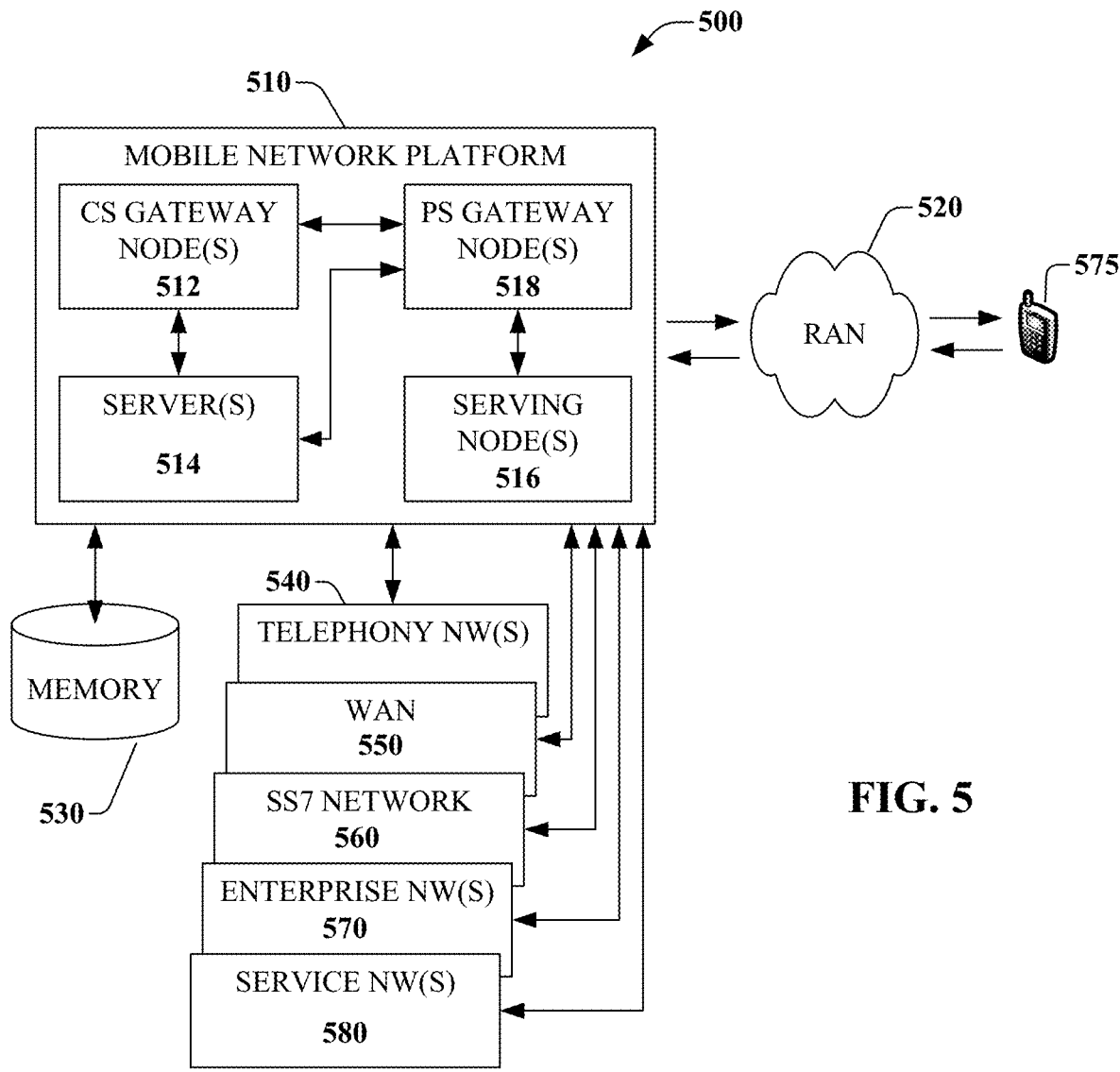
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
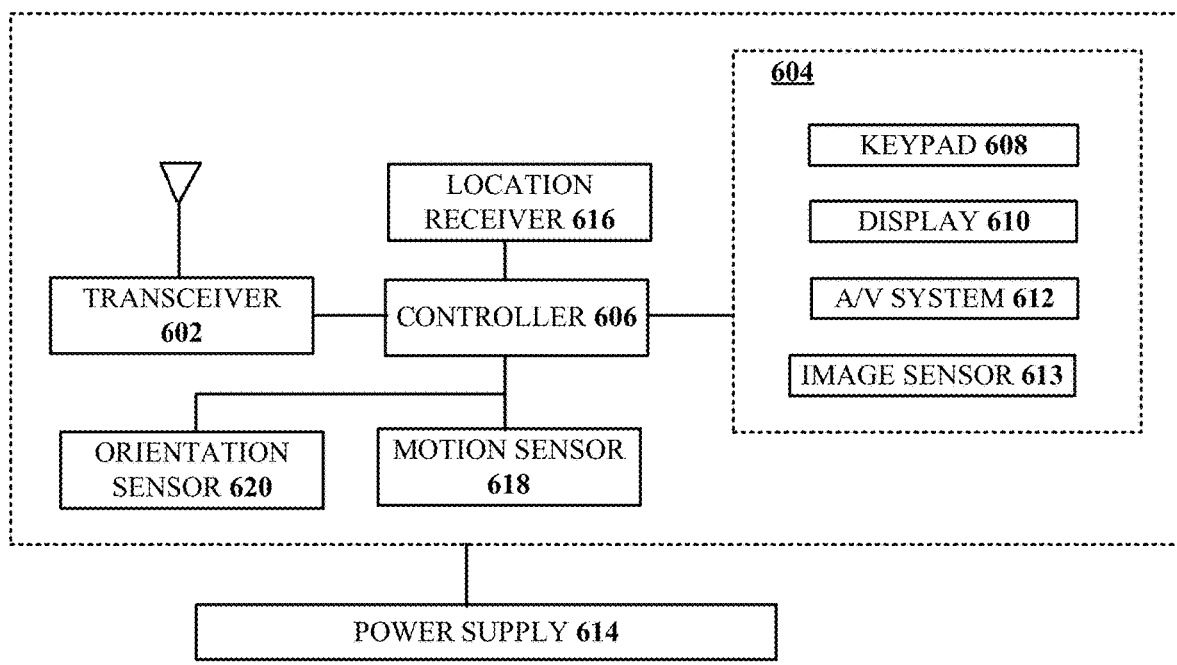
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   identifying, by a processing system including a processor, a plurality of performance indicators, the plurality of performance indicators including network performance indicators regarding a cellular network and device performance indicators regarding a communication device communicating with the cellular network;
   obtaining, by the processing system, data regarding each of the plurality of performance indicators for a past time period having a predetermined length, wherein the data regarding each of the plurality of performance indicators forms an array of values for that performance indicator;
   generating, by the processing system, a statistical summarization of the array;
   generating, by the processing system based on the data, a set of inputs to an algorithm for predicting a throughput of the cellular network during a future time period having a predetermined length, the algorithm comprising a machine learning algorithm trained according to the data;
   obtaining, by the processing system, a predicted throughput for the cellular network based on the algorithm; and
   allocating, by the processing system, network resources of the cellular network based on the predicted throughput.

2. The method of claim 1, further comprising providing, by the processing system, guidance based on the predicted throughput to a network element of the cellular network, a server connected to the cellular network, a client connected to the cellular network, an application executing on the cellular network, or a combination thereof.

3. The method of claim 1, wherein the set of inputs comprises the statistical summarization of the array.

4. The method of claim 1, wherein the statistical summarization comprises quantiles of the array.

5. The method of claim 1, wherein the machine learning algorithm comprises a regression algorithm.

6. The method of claim 1, wherein the predicted throughput corresponds to a statistical indicator of the throughput over the future time period.

7. The method of claim 1, further comprising selecting, by the processing system, the length of the past time period and the length of the future time period.

8. The method of claim 1, further comprising selecting, by the processing system, the algorithm from a plurality of algorithms based on comparing an actual throughput for the cellular network with the predicted throughput obtained using each of the plurality of algorithms.

9. The method of claim 1, wherein the communication device is a mobile device, and wherein the device performance indicators include a physical speed of the communication device.

10. The method of claim 1, wherein the network comprises a plurality of cells, and wherein the network performance indicators include a cell load for each of the plurality of cells.

11. A device comprising:
a processing system including a processor; and
a memory that stores executable instructions that, when executed by the processing system, facilitate performance of operations comprising:
identifying a plurality of performance indicators, the plurality of performance indicators including network performance indicators regarding a cellular network and device performance indicators regarding a mobile communication device communicating with the cellular network;
obtaining data regarding each of the plurality of performance indicators for a past time period having a predetermined length, wherein the data regarding each of the plurality of performance indicators forms an array of values for that performance indicator;
generating a statistical summarization of the array;
generating, based on the data, a set of inputs to an algorithm for predicting a throughput of the cellular network during a future time period having a predetermined length, the algorithm comprising a machine learning algorithm trained according to the data;
obtaining a predicted throughput for the cellular network based on the algorithm; and
allocating network resources of the cellular network based on the predicted throughput.

12. The device of claim 11, wherein the device performance indicators include a physical speed of the communication device.

13. The device of claim 11, wherein the set of inputs comprises the statistical summarization of the array.

14. The device of claim 11, wherein the predicted throughput corresponds to a statistical indicator of the throughput over the future time period.

15. The device of claim 11, wherein the operations further comprise selecting the length of the past time period and the length of the future time period.

16. The device of claim 11, wherein the operations further comprise selecting the algorithm from a plurality of algorithms based on comparing an actual throughput for the cellular network with the predicted throughput obtained using each of the plurality of algorithms.

17. A non-transitory machine-readable medium comprising executable instructions that, when executed by a processing system including a processor, facilitate performance of operations comprising:
identifying a plurality of performance indicators, the plurality of performance indicators including network performance indicators regarding a cellular network and device performance indicators regarding a communication device communicating with the cellular network;
obtaining data regarding each of the plurality of performance indicators for a past time period having a predetermined length, wherein the data regarding each of the plurality of performance indicators forms an array of values for that performance indicator;
generating a statistical summarization of the array;
generating, based on the data, a set of inputs to an algorithm for predicting a throughput of the cellular network during a future time period having a predetermined length, the algorithm comprising a machine learning algorithm trained according to the data, the machine learning algorithm comprising a regression algorithm;
obtaining a predicted throughput for the cellular network based on the algorithm; and
allocating network resources of the cellular network based on the predicted throughput.

18. The non-transitory machine-readable medium of claim 17, wherein the set of inputs comprises the statistical summarization of the array.

19. The non-transitory machine-readable medium of claim 17, wherein the predicted throughput corresponds to a statistical indicator of the throughput over the future time period.

20. The non-transitory machine-readable medium of claim 17, wherein the operations further comprise selecting the length of the past time period and the length of the future time period.

* * * * *